United States Patent
Maenaka et al.

(10) Patent No.: US 7,981,511 B2
(45) Date of Patent: Jul. 19, 2011

(54) HOLLOW RESIN FINE PARTICLES, ORGANIC/INORGANIC HYBRID FINE PARTICLES, AND METHOD FOR PRODUCING HOLLOW RESIN FINE PARTICLES

(75) Inventors: Hiroshi Maenaka, Osaka (JP); Michiya Nakagawa, Osaka (JP); Hiroyuki Nishimoto, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 319 days.

(21) Appl. No.: 11/547,611

(22) PCT Filed: Mar. 16, 2005

(86) PCT No.: PCT/JP2005/004688
§ 371 (c)(1),
(2), (4) Date: Nov. 22, 2006

(87) PCT Pub. No.: WO2005/097870
PCT Pub. Date: Oct. 20, 2005

(65) Prior Publication Data
US 2007/0251422 A1    Nov. 1, 2007

(30) Foreign Application Priority Data

| Apr. 5, 2004 | (JP) | 2004-111369 |
| Sep. 6, 2004 | (JP) | 2004-258424 |
| Nov. 1, 2004 | (JP) | 2004-318300 |
| Jan. 28, 2005 | (JP) | 2005-022221 |

(51) Int. Cl.
*B32B 5/66* (2006.01)
(52) U.S. Cl. .... 428/403; 428/407; 427/212; 427/213.36
(58) Field of Classification Search .................. 428/403, 428/407; 427/212, 213.36
See application file for complete search history.

(56) References Cited

U.S. PATENT DOCUMENTS

| 5,989,630 A * | 11/1999 | Schlarb et al. ........... 427/213.36 |
| 6,624,272 B2 * | 9/2003 | Futami et al. ............. 526/307.3 |

FOREIGN PATENT DOCUMENTS

| JP | 1-185311 | 7/1989 |
| JP | 2-255704 | 10/1990 |
| JP | 5-40770 | 6/1993 |
| JP | 6-248012 | 9/1994 |
| JP | 7-92305 | 4/1995 |
| JP | 8-20604 | 1/1996 |
| JP | 8-48075 | 2/1996 |
| JP | 8-131816 | 5/1996 |
| JP | 9-101518 | 4/1997 |
| JP | 10-24233 | 1/1998 |
| JP | 10-142402 | 5/1998 |
| JP | 10-195148 | 7/1998 |
| JP | 2001-233611 | * 8/2001 |
| JP | 2001-240627 | 9/2001 |
| JP | 2002-317152 | 10/2002 |
| JP | 2003-292805 | 10/2003 |
| JP | 2003-344603 | 12/2003 |
| JP | 2004-258267 | 9/2004 |

OTHER PUBLICATIONS

Supplemental European Search Report; issued Sep. 18, 2008.

* cited by examiner

*Primary Examiner* — Leszek Kiliman
(74) *Attorney, Agent, or Firm* — Wenderoth, Lind & Ponack, L.L.P.

(57) ABSTRACT

It is the object of the present invention to provide a hollow resin particle and an organic-inorganic hybrid particle, which have excellent dispersibility in a binder component and prevent the diffuse reflection of light and can attain an antireflection layer having high alkali resistance when used as a particle constituting an antireflection layer having a low refractive index, and a method of producing the hollow resin particle.

26 Claims, No Drawings

HOLLOW RESIN FINE PARTICLES, ORGANIC/INORGANIC HYBRID FINE PARTICLES, AND METHOD FOR PRODUCING HOLLOW RESIN FINE PARTICLES

This application is a U.S. national stage of International Application No. PCT/JP2005/004688 filed Mar. 16, 2005.

TECHNICAL FIELD

The present invention relates to a hollow resin particle and an organic-inorganic hybrid particle, which have excellent dispersibility in a binder component and prevent the diffuse reflection of light and can attain an antireflection layer having high alkali resistance when used as a particle constituting an antireflection layer having a low refractive index, and a method of producing the hollow resin particle.

BACKGROUND ART

A liquid crystal display used for personal computers, word processors, mobile phones and the like, and other various commercial displays are used in extremely wide ranging area. Transparent substrates of glass, plastic and the like are used in these displays and visual information such as substances, letters, figures and the like are recognized through these transparent substrates.

The practical problems of these displays include the deterioration of visibility due to the reflection of a display surface. That is, when a display is used in such environments that external light enters the display irrespective of from indoor or outdoor, visual information within the display becomes less visible because of reflection of incident light such as external light on the surface of the transparent substrate.

A method of preventing such reflection on a transparent substrate includes, for example, a method in which a coating layer having concavities and convexities is formed on the surface of a transparent substrate and external light is reflected diffusely by these concavities and convexities on the surface.

For example in Patent Document 1, there is disclosed an antireflection layer having concavities and convexities resulting from silica particles or agglomerated silica particles on its surface, which is obtained by mixing a silica dispersion into a silicate base coating agent prepared by a sol-gel method, applying the resulting mixture onto a glass substrate and baking it. And, in Patent Document 2, there is disclosed an antireflection layer which is formed by forming an intermediate layer based on a resin on a transparent base film and applying a coating solution containing organic ultra fine particles having a refractive index of 1.45 or less onto this intermediate layer and which has an outermost layer above which the surfaces of the organic ultra fine particles are exposed as concavities and convexities.

However, a method, in which concavities and convexities are formed on the surface of a transparent substrate and external light is reflected diffusely by these concavities and convexities, reduces apparent glare but does not reduce the whole quantity of reflected light, and this method has a problem that the antireflection film entirely looks whitish. Also, there was a problem that soil such as fingerprints, sebum, sweat and cosmetics is apt to adhere to the concavities and convexities at the surface and the adherent soil cannot be easily removed because of minute concavities and convexities.

On this problem, a method of forming an antireflection layer having a low refractive index on the surface of a transparent substrate is proposed. By forming the antireflection layer having a low refractive index on the surface of a transparent substrate, there are not problems of diffuse reflection of light and soil and the reflection on a transparent substrate can be prevented.

As such the antireflection layer having a low refractive index, layers comprising silicon base or fluorine base material have been used, but since these materials generally have poor adhesion to a transparent substrate, for example, antireflection films, in which a coating layer is formed on the transparent substrate using a coating agent obtained by dispersing particles having a low refractive index such as silica particles having a particle size of the order of nanometer, are attempted. For example, in Patent Document 3, there are disclosed a coating agent having a low refractive index in which hollow silica particles are mixed using an organic silicon compound polymer having a certain structure as a binder, and an antireflection film using the coating agent having a low refractive index.

However, since silica particles are less resistant to an alkali solution, a coating layer containing silica particles had a problem that the performance was deteriorated if a commercially available alkali detergent and the like were used for wiping out soil.

And when an inorganic base organic silicon compound polymer and the like are used as a binder component of a coating agent having low refractive index, the resulting coating layer was brittle and lacking in mechanical strength. On this problem, by using an organic binder component such as a transparent resin as a binder component of a coating agent having low refractive index, a coating layer which is superior in a film forming property and mechanical strength is obtained, however, since the silica particle has high dispersibility in an inorganic binder component such as an inorganic base organic silicon compound but has low dispersibility in an organic binder component such as a transparent resin, there was also a problem that it was difficult to use the transparent resin which was superior in a film forming property and mechanical strength as a binder due to the dispersibility in a resin as long as silica particle is used.

On this problem, it is also studied to use a hollow resin particle having a hollow rate of above a certain level as a particle having a low refractive index. Since the hollow resin particle has excellent alkali resistance and excellent dispersibility in a binder, it is expected that by use of such a hollow resin particle, reflection on the transparent substrate can be efficiently inhibited and an antireflection film having resistance to soil and cleaning and high mechanical strength can be attained.

As a method of producing such a hollow resin particle, there is disclosed, for example, in Patent Document 4 and Patent Document 5, a method of producing a polymer particle having a hollow in its inside by forming a core-shell type polymer by emulsion polymerization and treating it with a base, or a base and an acid. And, in Patent Document 6 and Patent Document 7, there is disclosed a method of producing a hollow resin particle by radical polymerization. And, in Patent Document 8, there is disclosed a method of producing a hollow resin particle by seed polymerization. Further, in Patent Document 9, Patent Document 10 and Patent Document 11, there is disclosed a method of producing a micro capsule having a shell obtained by an interfacial reaction.

However, though it is essential to achieve a high hollow rate in order to make the hollow resin particle have sufficiently low refractive index, all particles obtained by these methods had a particle size of the order of micrometer, and a hollow resin particle having a particle size of the order of nanometer, which attains enough high hollow rate to achieve a sufficient low refractive index, was not obtained.

Patent Document 1: Japanese Kokai Publication Hei-9-101518
Patent Document 2: Japanese Kokai Publication Hei-7-092305
Patent Document 3: Japanese Kokai Publication 2002-317152
Patent Document 4: Japanese Kokai Publication Hei-1-185311
Patent Document 5: Japanese Kokai Publication Hei-6-248012
Patent Document 6: Japanese Kokai Publication Hei-2-255704
Patent Document 7: Japanese Kokoku Publication Hei-5-040770
Patent Document 8: Japanese Kokai Publication Hei-8-20604
Patent Document 9: Japanese Kokai Publication Hei-8-48075
Patent Document 10: Japanese Kokai Publication Hei-8-131816
Patent Document 11: Japanese Kokai Publication Hei-10-24233

DISCLOSURE OF THE INVENTION

Problems which the Invention is to Solve

In view of the above state of the art, it is an object of the present invention to provide a hollow resin particle and an organic-inorganic hybrid particle, which have excellent dispersibility in a binder component and prevent the diffuse reflection of light and can attain an antireflection layer having high alkali resistance when used as a particle constituting an antireflection layer having a low refractive index, and a method of producing the hollow resin particle.

Means for Solving the Object

The present invention is a hollow resin particle, which has a single hollow structure, an average particle diameter being 10 to 100 nm and a refractive index being 1.40 or less.

Hereinafter, the present invention will be described in detail.

The hollow resin particle of the present invention is hollow, having a single hollow structure.

In the present description, the term single hollow structure means that the structure does not have a plurality of hollows such as porous body and has only one hollow. The interior of the hollow has high hermetic property because of a single hollow structure and therefore when the hollow resin particle of the present invention is used for, for example, an antireflection film, it is possible to prevent a binder or another components from penetrating into particles to decrease the hollow rate.

Gas exists within the hollow. Such a gas is preferably air but another gas may exist. Since the refractive index of air phase is approximately 1.00, an extremely low refractive index can be realized by a hollow structure.

In the hollow resin particle of the present invention, a lower limit of an average particle diameter is 10 nm and an upper limit is 100 nm. If it is less than 10 nm, the agglomeration of the hollow resin particles occurs to deteriorate handling property. If it is more than 100 nm, in the case of using the hollow resin particle of the present invention for, for example, an antireflection film, concavities and convexities based on the hollow resin particle are produced on the surface of the antireflection film to cause the deterioration of smoothness, and the transparency of the antireflection film is deteriorated resulting from Rayleigh scattering of the surface of the hollow resin particle to cause images to be whitened. A preferred upper limit is 70 nm and a more preferred upper limit is 50 nm.

In the hollow resin particle of the present invention, an upper limit of refractive index is 1.40. If it is more than 1.40, in the case of using the hollow resin particle of the present invention for, for example, an antireflection film, a sufficient effect of preventing incident light such as external light from reflecting cannot be attained and a thickness of the antireflection film required for preventing reflection becomes too thick. A preferred upper limit is 1.35 and a more preferred upper limit is 1.30.

In the hollow resin particle of the present invention, a preferred lower limit of a hollow rate is 30%. If it is less than 30%, it may be impossible to realize an adequately low refractive index. An upper limit of the hollow rate is not particularly limited but a preferred upper limit is 95% and a more preferred upper limit is 70% since it is necessary to maintain the shape and secure the certain degree of strength.

In the hollow resin particle of the present invention, a preferred upper limit of a CV value of a particle diameter is 20%. If it is more than 20%, a ratio of a coarse particle of 100 nm or more increases and in the case of using the hollow resin particle of the present invention for, for example, an antireflection film, the transparency and smoothness of the antireflection film may be deteriorated. A more preferred upper limit is 15%.

Such the hollow resin particle of the present invention can be suitably produced by a method of producing the hollow resin particle in which a lipophilic reaction component A and a hydrophilic reaction component B, described later, are used. The hollow resin particle of the present invention produced by such a method has an outermost layer comprising at least a resin obtained by a reaction of the lipophilic reaction component A and the hydrophilic reaction component B.

The above-mentioned lipophilic reaction component A is not particularly limited and includes, for example, polyisocyanate, an epoxy prepolymer and acid halide.

The above-mentioned polyisocyanate has a lipophilic property and reacts with a hydrophilic reaction component such as water, amine, polyol, and polycarboxylic acid to give a resin. The above-mentioned polyisocyanate is not particularly limited and includes, for example, biuret type, adduct type and isocyanurate type polyisocyanates.

In addition, the above-mentioned polyisocyanate, polyol and polycarboxylic acid mean a compound having a plurality of these functional groups in a molecule.

The above-mentioned epoxy prepolymer has a lipophilic property and reacts with amine, polycarboxylic acid, acid anhydride, polythiol, or a phenol resin to give a resin.

The above epoxy prepolymer is not particularly limited and includes, for example, a bisphenol A type, a resorcin type, a bisphenol F type, a tetraphenylmethane type, a novolac type, a polyalcohol type, a polyglycol type, a glycerin triether type, a glycidyl ether type, a glycidyl ester type, a glycidyl amine type, an aliphatic type, an alicyclic type, an aminophenol type, a hydantoin type, an isocyanurate, a biphenol type, a naphthalene type, or a hydrogenated compound and a fluorinated compound thereof. Among others, it is preferably a fluorinated compound. By using a fluorinated compound as the above-mentioned epoxy prepolymer, it is possible to reduce effectively the refractive index of the hollow resin particle of the present invention and inhibit a polar medium and the like described later from penetrating into hollows.

An epoxy equivalent weight of such an epoxy prepolymer is not particularly limited but a preferred upper limit is 500. By using an epoxy prepolymer, an epoxy equivalent weight of which has an upper limit of 500, a resin which has a high degree of crosslinking and is superior in heat resistance, solvent resistance and strength can be obtained. A more preferred upper limit is 200.

An epoxy prepolymer, an epoxy equivalent weight of which has an upper limit of 200, is not particularly limited and includes, for example, bisphenol A type epoxy resins such as EPOTOHTO YD-115, EPOTOHTO YD-127, EPOTOHTO YD-128 (trade name, all produced by Tohto Kasei Co., Ltd.), Epikote 825, Epikote 827, Epikote 828 (trade name, all produced by Japan Epoxy Resins Co., Ltd.), EPICLON 840, and EPICLON 850 (trade name, all produced by DAINIPPON INK AND CHEMICALS, INCORPORATED); bisphenol F type epoxy resins such as EPOTOHTO YDF-170, EPOTOHTO YDF-175S (trade name, all produced by Tohto Kasei Co., Ltd.), Epikote 806, Epikote 807 (trade name, all produced by Japan Epoxy Resins Co., Ltd.), EPICLON 830, and EPICLON 835 (trade name, all produced by DAINIPPON INK AND CHEMICALS, INCORPORATED); novolac type epoxy resins such as EPOTOHTO YDPN-638, EPOTOHTO YDCN-701, EPOTOHTO YDCN-702, EPOTOHTO YDCN-703, EPOTOHTO YDCN-704, EPOTOHTO YDCN-500 (trade name, all produced by Tohto Kasei Co., Ltd.), Epikote 152, Epikote 154 (trade name, all produced by Japan Epoxy Resins Co., Ltd.), EPICLON N-655, EPICLON N-740, EPICLON N-770, EPICLON N-775, and EPICLON N-865 (trade name, all produced by DAINIPPON INK AND CHEMICALS, INCORPORATED); special polyfunctional type epoxy resins such as EPOTOHTO YH-434, EPOTOHTO YH-434L (trade name, all produced by Tohto Kasei Co., Ltd.), Epikote 1031S, Epikote 1032H60, Epikote 604, Epikote 630 (trade name, all produced by Japan Epoxy Resins Co., Ltd.), EPICLON 430 (trade name, produced by DAINIPPON INK AND CHEMICALS, INCORPORATED), TETRAD-X, and TETRAD-C (trade name, all produced by Mitsubishi Gas Chemical Co., Ltd.); biphenyl type epoxy resins such as Epikote YX4000, Epikote YL6121H Epikote YL6640, and Epikote YL6677 (trade name, all produced by Japan Epoxy Resins Co., Ltd.); aliphatic polyglycidyl ether type epoxy resins such as EPOTOHTO YH-300, EPOTOHTO YH-301, EPOTOHTO YH-315, EPOTOHTO YH-324, and EPOTOHTO YH-325 (trade name, all produced by Tohto Kasei Co., Ltd.); crystalline epoxy resins such as EPOTOHTO YDC-1312, and EPOTOHTO YSLV-80XY (trade name, all produced by Tohto Kasei Co., Ltd.); naphthalene type epoxy resins such as EPICLON HP-4032, and EPICLON EXA-4700 (trade name, all produced by DAINIPPON INK AND CHEMICALS, INCORPORATED); special functional type epoxy resins such as Epikote 191P, Epikote YX310 (trade name, all produced by Japan Epoxy Resins Co., Ltd.), and EPICLON HP-820 (trade name, produced by DAINIPPON INK AND CHEMICALS, INCORPORATED); reactive diluents such as EPICLON 725 (trade name, produced by DAINIPPON INK AND CHEMICALS, INCORPORATED), or fluorinated compounds thereof. Among others, it is preferably a fluorinated compound. By using a fluorinated compound, it is possible to reduce effectively the refractive index of the hollow resin particle of the present invention and inhibit a polar medium and the like described later from penetrating into hollows.

And, an epoxy prepolymer having an epoxy equivalent weight of more than 200 and 500 or less is not particularly limited and includes, for example, bisphenol A type epoxy resins such as EPOTOHTO YD-134, EPOTOHTO YD-011 (trade name, all produced by Tohto Kasei Co., Ltd.), Epikote 801, Epikote 1001 (trade name, all produced by Japan Epoxy Resins Co., Ltd.), EPICLON 860, EPICLON 1050, and EPICLON 1055 (trade name, all produced by DAINIPPON INK AND CHEMICALS, INCORPORATED); bisphenol F type epoxy resins such as EPOTOHTO YDF-2001 (trade name, produced by Tohto Kasei Co., Ltd.); novolac type epoxy resins such as EPICLON N-660, EPICLON N-665, EPICLON N-670, EPICLON N-673, EPICLON N-680, and EPICLON N-695 (trade name, all produced by DAINIPPON INK AND CHEMICALS, INCORPORATED); special polyfunctional type epoxy resins such as Epikote 157S70 (trade name, produced by Japan Epoxy Resins Co., Ltd.), and EPICLON 5500 (trade name, produced by DAINIPPON INK AND CHEMICALS, INCORPORATED); brominated epoxy resins such as EPOTOHTO YDB-360, EPOTOHTO YDB-400, EPOTOHTO YDB-405 (trade, name, all produced by Tohto Kasei Co., Ltd.), EPICLON 152, and EPICLON 153 (trade name, all produced by DAINIPPON INK AND CHEMICALS, INCORPORATED); flexible epoxy resins such as EPOTOHTO YD-171 (trade name, produced by Tohto Kasei Co., Ltd.), Epikote 871 (trade name, produced by Japan Epoxy Resins Co., Ltd.), EPICLON TSR-960, and EPICLON TSR-601 (trade name, all produced by DAINIPPON INK AND CHEMICALS, INCORPORATED); hydrogenated type epoxy resins such as EPOTOHTO ST-3000 (trade name, produced by Tohto Kasei Co., Ltd.), Epikote YX8000, and Epikote YX8034 (trade name, all produced by Japan Epoxy Resins Co., Ltd.); dicyclopentadiene type epoxy resins such as EPICLON HP-7200 (trade name, produced by DAINIPPON INK AND CHEMICALS, INCORPORATED), or fluorinated compounds thereof. Among others, it is preferably a fluorinated compound. By using a fluorinated compound, it is possible to reduce effectively the refractive index of the hollow resin particle of the present invention and inhibit a polar medium and the like described later from penetrating into hollows.

These epoxy prepolymers may be used alone or in combination of two or more species.

In addition, an epoxy prepolymer having an epoxy equivalent weight of more than 500 includes, for example, bisphenol A type epoxy resins such as EPOTOHTO YD-012, EPOTOHTO YD-013, EPOTOHTO YD-014, EPOTOHTO YD-017, EPOTOHTO YD-019 (trade name, all produced by Tohto Kasei Co., Ltd.), Epikote 1002, Epikote 1003, Epikote 1055, Epikote 1004, Epikote 1007, Epikote 1009, Epikote 1010 (trade name, all produced by Japan Epoxy Resins Co., Ltd.), EPICLON 3050, EPICLON 4050, EPICLON AM-020-P, EPICLON AM-030-P, EPICLON AM-040-P, EPICLON 7050, EPICLON HM-091, and EPICLON HM-101 (trade name, all produced by DAINIPPON INK AND CHEMICALS, INCORPORATED); bisphenol F type epoxy resins such as EPOTOHTO YDF-2004 (trade name, produced by Tohto Kasei Co., Ltd.), Epikote 4004P, Epikote 4007P, Epikote 4010P, Epikote 4110, and Epikote 4210 (trade name, all produced by Japan Epoxy Resins Co., Ltd.); brominated epoxy resins such as EPOTOHTO YDB-405 (trade name, produced by Tohto Kasei Co., Ltd.), and EPICLON 1123P-75M (trade name, produced by DAINIPPON INK AND CHEMICALS, INCORPORATED); flexible epoxy resins such as EPOTOHTO YD-172 (trade name, produced by Tohto Kasei Co., Ltd.), Epikote 872 (trade name, produced by Japan Epoxy Resins Co., Ltd.), and EPICLON 1600-75X (trade name, produced by DAINIPPON INK AND CHEMICALS, INCORPORATED); hydrogenated type epoxy resins such as EPOTOHTO ST-4000D (trade name, produced by Tohto Kasei Co., Ltd.); polyfunctional type epoxy resins such as EPICLON 5800 (trade name, produced by DAINIPPON INK AND CHEMICALS, INCORPORATED), or fluorinated compounds thereof. Among others, it is preferably a fluorinated compound. By using a fluorinated compound, it is possible to reduce effectively the refractive index of the hollow resin particle of the present invention and inhibit a polar medium and the like described later from penetrating into hollows.

The above-mentioned acid halide is not particularly limited and includes, for example, dibasic acid halide such as adipoyl dichloride, phthaloyl dichloride, terephthaloyl dichloride and 1,4-cyclohexanedicarbonyl chloride.

By using the substance described above as the above lipophilic reaction component A, the hollow resin particle of the present invention becomes superior in heat resistance, solvent resistance and strength.

The above-mentioned hydrophilic reaction component B is not particularly limited and it is appropriately determined in accordance with the above lipophilic reaction component A so that it reacts with the above lipophilic reaction component A to produce a resin.

Specifically, for example when polyisocyanate is used as the above lipophilic reaction component A, at least one species selected from the group consisting of water, amine, polyol, and polycarboxylic acid is suitably used as the above hydrophilic reaction component B.

In this case, polyisocyanate reacts with water and/or amine to produce polyurea, polyisocyanate reacts with polyol to produce polyurethane, and polyisocyanate reacts with polycarboxylic acid to produce polyamide.

And, for example when an epoxy prepolymer is used as the above lipophilic reaction component A, amine and/or polycarboxylic acid is suitably used as the above hydrophilic reaction component B.

In this case, the epoxy prepolymer reacts with amine, polycarboxylic acid, polythiol, and/or a phenol resin to produce an epoxy polymer.

And, for example when acid halide is used as the above lipophilic reaction component A, amine or polyol is suitably used as the above hydrophilic reaction component B.

In this case, the acid halide reacts with amine or polyol to produce nylon or polyester.

The above-mentioned amine is not particularly limited and includes, for example, aliphatic amines such as ethylenediamine and adducts thereof, diethylenetriamine, dipropylenetriamine, triethylenetetramine, tetraethylenepentamine, dimethylaminopropylamine, diethylaminopropylamine, dibutylaminopropylamine, hexamethylenediamine and modified products thereof, N-aminoethylpiperazine, bis-aminopropylpiperazine, trimethylhexamethylenediamine, bis-hexamethylenetriamine, dicyandiamide, diacetoacrylamide, various modified aliphatic polyamines and polyoxypropylenediamine; alicyclic amines and modified products thereof such as 3,3'-dimethyl-4,4'-diaminodicyclohexylmethane, 3-amino-1-cyclohexylaminopropane, 4,4'-diaminodicyclohexylmethane, isophorone diamine, 1,3-bis(aminomethyl)cyclohexane and N-dimethylcyclohexylamine; aromatic amines and modified products thereof such as 4,4'-diaminodiphenylmethane (methylenedianiline), 4,4'-diaminodiphenyl ether, diaminodiphenyl sulfone, m-phenylenediamine, 2,4'-toluilenediamine, m-toluilenediamine, o-toluilenediamine, methaxylylenediamine and xylylenediamine; polyamidoamines such as modified products of another special amines, amidoamines and amino polyamide resin; tertiary amines and complex compounds thereof such as dimethylaminomethylphenol, 2,4,6-tri(dimethylaminomethyl)phenol and tri-2-ethylhexanoic acid salt of tri(dimethylaminomethyl)phenol; imidazoles such as ketimine, 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 1-cyanoethyl-2-methylimidazole, 1-cyanoethyl-2-undecylimidazole, 1-cyanoethyl-2-isopropylimidazole, 1-cyanoethyl-2-phenylimidazole, 1-cyanoethyl-2-methylimidazole trimelitate, 1-cyanoethyl-2-undecylimidazole trimelitate, 1-cyanoethyl-2-phenylimidazole trimelitate, 2,4-diamino-6-[2'-methylimidazolyl-(1)']-ethyl-s-triazine, 2,4-diamino-6-[2'-undecylimidazolyl-(1)']-ethyl-s-triazine, 2,4-diamino-6-[2'-ethyl-4'-methylimidazolyl-(1)']-ethyl-s-triazine, 1-dodecyl-2-methyl-3-benzylimidazoliumchloride, 1,3-dibenzyl-2-methylimidazoliumchloride, 2-phenyl-4-methyl-5-hydroxymethylimidazole, 2-phenyl-4,5-dihydroxymethylimidazole, 1-cyanoethyl-2-phenyl-4,5-di(cyanoethoxymethyl)imidazole, a composite of 2-methylimidazole and triazine and a composite of 2-phenylimidazole and triazine; hydrazides such as isophthalic dihydrazide, adipic dihydrazide and sebacic dihydrazide; and amino group-containing prepolymers such as amino adducts of epoxy resin.

The above-mentioned polyol is not particularly limited and includes, for example, ethylene glycol, 1,4-butanediol, 2,3-butanediol, catechol, resorcinol, hydroquinone, o-dihydroxymethylbenzene, 4,4'-dihydroxydiphenylmethane, 2,2-bis(4-hydroxyphenyl)propane, 1,1,1-trimethylolpropane; and hydroxyl group-containing polymers such as polyvinyl alcohol, polyhydroxymethacrylate, polyethylene glycol, polyoxypropylene glycol and polyoxyalkylene glycol.

The above-mentioned polycarboxylic acid is not particularly limited and includes, for example, a polymer containing any one of oxalic acid, adipic acid, azelaic acid, sebacic acid, malonic acid, succinic acid, 1,4-cyclohexyldicarboxylic acid, (o-, m-, p-)benzenedicarboxylic acid, maleic acid, itaconic acid, acrylic acid, and methylmethacrylic acid in an amount of 10% by weight.

By using the substance describe above as the above hydrophilic reaction component B, the hollow resin particle of the present invention becomes superior in heat resistance, solvent resistance and strength.

The outermost layer of the hollow resin particle of the present invention preferably contains at least one species of resin selected from the group consisting of polyurea, polyurethane, polyamide, polyester, nylon and epoxy polymer obtained by a combination of the above lipophilic reaction component A and the above hydrophilic reaction component B.

Further, the hollow resin particle of the present invention preferably contains a resin crosslinked by an inorganic component. Such the hollow resin particle of the present invention has an inorganic matrix in its structure and therefore it has excellent heat resistance and solvent resistance and can prevent effectively a binder component from penetrating into hollows.

Such a resin crosslinked by an inorganic component can be obtained, for example, by reacting a functional group of a resin contained in the hollow resin particle of the present invention with a silane coupling agent having an epoxy group, an isocyanate group, a ureido group, an amino group, a mercapto group, or a halogen group within its structure.

The hollow resin particle of the present invention having such a single hollow structure can be suitably produced by a method which comprises: a step of preparing a dispersion obtained by dispersing a polymerizable droplet containing the above lipophilic reaction component A in a polar medium containing the above hydrophilic reaction component B; and a step of reacting the above lipophilic reaction component A with the above hydrophilic reaction component B.

Such a method of producing the hollow resin particle also constitutes the present invention.

A method of producing the hollow resin particle of the present invention comprises a step of preparing a dispersion obtained by dispersing a polymerizable droplet containing the above lipophilic reaction component A in a polar medium containing the above hydrophilic reaction component B.

In the method of producing the hollow resin particle of the present invention, a non-polymerizable compound may be mixed in the above lipophilic reaction component A.

The above-mentioned non-polymerizable compound has the function of forming stable polymerizable droplets in a polar medium or controlling a rate of reaction between the lipophilic reaction component A and the hydrophilic reaction component B. And, by mixing the non-polymerizable compound in the above lipophilic reaction component A, the above non-polymerizable compound (and an unreacted lipophilic reaction component A) is encapsulated in a resin particle prepared by a step described later, and by removing the above non-polymerizable compound (and an unreacted lipophilic reaction component A) from such a resin particle, a hollow resin particle having high hollow rate can be produced.

The above-mentioned non-polymerizable compound is not particularly limited as long as it is liquid at a temperature of a reaction of the above lipophilic reaction component A and the above hydrophilic reaction component B, can be mixed with but is not reacted with the lipophilic reaction component A, and can be transpired easily upon heating, and it includes, for example, organic solvents such as butane, pentane, hexane, cyclohexane, toluene, xylene, octane, nonane, decane, undecane, dodecane, tridecane, tetradecane, heptadecane, hexadecane, heptadecane, octadecane, nonadecane, eicosane, ethyl acetate, methyl ethyl ketone, methyl isobutyl ketone, methyl amyl ketone, diisobutyl ketone, methyl chloride, methylene chloride, chloroform, and carbon tetrachloride.

The above-mentioned non-polymerizable compound may be used alone or in combination of two or more species.

Since higher alkanes having about 8 to 20 carbon atoms or long chain hydrophobic compounds, such as octane, nonane, decane, undecane, dodecane, tridecane, tetradecane, heptadecane, hexadecane, heptadecane, octadecane, nonadecane and eicosane of the above-mentioned non-polymerizable compounds, can inhibit effectively the coalescence of polymerizable droplets in a polar medium, if theses non-polymerizable compounds are used appropriately in combination with a non-polymerizable compound other than theses compounds, polymerizable droplets having a particle size of the order of nanometer can be stably formed.

An amount of the above non-polymerizable compound to be mixed is not particularly limited, but a preferred lower limit is 10 parts by weight with respect to 90 parts by weight of the above lipophilic reaction component A and a preferred upper limit is 1000 parts by weight. If it is less than 10 parts by weight, the hollow rate of a hollow resin particle to be obtained becomes low and it may be impossible to realize an adequate refractive index, and if it is more than 1000 parts by weight, the shape of a particle cannot be maintained when the non-polymerizable compound is removed and therefore there may be cases where the hollow resin particle cannot be obtained or the strength of a hollow resin particle to be obtained is extremely low.

The above-mentioned polar medium is not particularly limited and includes mediums used in usual suspension polymerization and the like such as water, ethanol, methanol and isopropyl alcohol. Further, when the above lipophilic reaction component A is polyisocyanate, water and/or alcohol itself, used as a polar medium, also performs a function as a hydrophilic reaction component B.

A method of preparing the above-mentioned dispersion is not particularly limited and a publicly known method can be employed. For example, by using an emulsifier having high shearing force, a dispersion of a polymerizable droplet having a particle size of the order of nanometer can be suitably prepared. Such an emulsifier having high shearing force includes, for example, an omni mixer, an ultrasonic homogenizer, and a microfluidizer.

When the above dispersion is prepared, various additives may be added to the above polar medium, and these additives include, for example, anionic emulsifying agent such as sodium lauryl sulfate, sodium higher alcohol sulfate, triethanolamine lauryl sulfate, ammonium lauryl sulfate, sodium polyoxyethylene lauryl ether sulfate, sodium polyoxyethylene alkyl ether sulfate, triethanolamine polyoxyethylene alkyl ether sulfate, sodium dodecylbenzene sulfonate, sodium alkylnaphthalene sulfonate, sodium dialkyl sulfosuccinates, sodium alkyl diphenyl ether disulfonate, potassium polyoxyethylene alkyl ether phosphate, dipotassium alkenyl succinate and sodium alkane sulfonate, nonionic emulsifying agent such as polyoxyethylene lauryl ether, polyoxyethylene cetyl ether, polyoxyethylene stearyl ether, polyoxyethylene oleyl ether, polyoxyethylene myristyl ether, polyoxyethylene alkyl ether, polyoxyethylene higher alcohol ether, polyoxyethylene alkylene alkyl ether, polyoxyethylene distyrenated phenyl ether, sorbitan monolaurate, sorbitan monopalmitate, sorbitan monostearate, sorbitan tristearate, sorbitan monooleate, sorbitan trioleate, polyoxyethylene sorbitan monolaurate, polyoxyethylene sorbitan laurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, glycerol monostearate, glycerol monostearate and glycerol monooleate, cationic emulsifying agent such as lauryltrimethylammonium chloride, stearyltrimethylammonium chloride, cetyltrimethylammonium chloride, stearyltrimethylammonium chloride, distearyldimethylammonium chloride and alkylbenzylmethylammonium chloride, amphoteric emulsifying agent such as lauryl betaine, stearyl betaine, 2-alkyl-N-carboxymethyl-N-hydroxyethyl imidazolinium betaine and lauryl dimethyl amine oxide, high polymer dispersants such as partially saponified polyvinyl acetate, cellulose derivatives, poly(meth)acrylic acid, poly(meth)acrylic copolymer, polyvinylpyrrolidone, polyacrylamide, MALIALIM and polystyrene sulfonic acid, and dispersion aids such as cetyl alcohol.

The above-mentioned polymerizable droplet is obtained by dissolving the above lipophilic reaction component A uniformly. A method of producing the above polymerizable droplet is not particularly limited and includes, for example, a method in which the above lipophilic reaction component A and another lipophilic components such as additives added as required are weighed and mixed and then stirred until they are uniformly dissolved.

When higher alkane having about 8 to 20 carbon atoms or a long chain hydrophobic compound is used in combination with a non-polymerizable compound other than theses compounds for the purpose of forming polymerizable droplets having a particle size of the order of nanometer stably, the mixing proportion preferably has a lower limit of 0.1 parts by weight with respect to 100 parts by weight of the total of the lipophilic reaction component A and the non-polymerizable compound. If it is less than 0.1 parts by weight, it may be impossible to inhibit the coalescence of polymerizable droplets effectively.

The method of producing the hollow resin particle of the present invention comprises a step of reacting the above lipophilic reaction component A with the above hydrophilic reaction component B.

For example, by heating the above-mentioned dispersion to a temperature at which a reaction of the above lipophilic reaction component A and the above hydrophilic reaction component B is initiated, the above lipophilic reaction component A reacts with the above hydrophilic reaction component B to produce a resin. In this case, since the above polymerizable droplet containing the above lipophilic reaction component A and the above polar medium containing the above hydrophilic reaction component B are phase-separating, the reaction occurs only in the vicinity of the interface between the above polymerizable droplet and the above polar medium and the hollow resin particle of the present invention, which has a shell comprising the produced resin, is produced.

In such a method of producing the hollow resin particle of the present invention, an unreacted lipophilic reaction component A may be encapsulated in the hollow resin particle to be produced. In this case, the method of producing the hollow resin particle of the present invention preferably further comprises a step of removing the above encapsulated unreacted lipophilic reaction component A.

A method of removing the above unreacted lipophilic reaction component A from the hollow resin particle, in which the above unreacted lipophilic reaction component A is encapsulated, is not particularly limited and it includes, for example, a method of blowing gas such as nitrogen or air in a dispersion of the obtained hollow resin particle; a method of heating the above hollow resin particle above the boiling points of the unreacted lipophilic reaction component A and the used solvent; a method of reducing a pressure of a whole system; and a method of extracting the unreacted lipophilic reaction component A with a solvent.

The solvent used in the above extraction by a solvent is not particularly limited as long as it is a solvent which can be suitably mixed in the lipophilic reaction component A and for example, the non-polymerizable compound described above can be suitably used.

In accordance with such the method of producing the hollow resin particle of the present invention, it is possible to produce suitably the hollow resin particle of the present invention having a single hollow structure, of which a lower limit of an average particle diameter is 10 nm and an upper limit is 100 nm and a refractive index is 1.40 or less.

A hollow resin particle having a single hollow structure and a composite shell comprising at least two resin layers of an outermost layer and an inner layer, a hollow rate being 30% or more, also constitutes the present invention. Hereinafter, such a hollow resin particle is also referred to as a hollow resin particle of the second present invention.

The hollow resin particle of the second present invention has a single hollow structure and a composite shell comprising at least two resin layers of an outermost layer and an inner layer.

By using the composite shell comprising at least two resin layers of an outermost layer and an inner layer as a particle shell, the above-mentioned particle shell can have a plurality of functions and a hollow resin particle with a high hollow rate and a low refractive index can be effectively obtained. For example, the hollow resin particle, which comprises the outermost layer comprising a resin component having a high refractive index but having superior heat resistance, solvent resistance and strength and the inner layer comprising a resin component having inferior heat resistance, solvent resistance and strength but having a low refractive index, can enhance a hollow rate and lower a refractive index of the whole hollow resin particle in addition to improving heat resistance. In addition, by selecting appropriately a resin component constituting the outermost layer or the inner layer, it is possible to provide arbitrarily refractive index, polarity, crystallinity, heat resistance, solvent resistance, strength, weather resistance, transparency and the like to the hollow resin particle.

The hollow resin particle of the second present invention is hollow, having a single hollow structure.

The interior of the hollow has high hermetic property because of a single hollow structure and therefore when the hollow resin particle of the second present invention is used for, for example, an antireflection film, it is possible to prevent a binder or another components from penetrating into particles to decrease the hollow rate.

And, gas exists within the hollow. Such a gas is preferably air but another gas may exist. Since the refractive index of air phase is approximately 1.00, an extremely low refractive index can be realized by a hollow structure.

In the hollow resin particle of the second present invention, a lower limit of a hollow rate is 30%. If it is less than 30%, it is impossible to realize an adequately low refractive index. An upper limit of the hollow rate is not particularly limited but a preferred upper limit of the hollow rate is 95% and a more preferred upper limit is 70% since it is necessary to maintain the shape and secure the certain degree of strength.

In the hollow resin particle of the second present invention, a preferred lower limit of an average particle diameter is 10 nm and a preferred upper limit is 100 nm. If it is less than 10 nm, the agglomeration of the hollow resin particles of the second present invention may occur to deteriorate handling property, and if it is more than 100 nm, in the case of using the hollow resin particle of the second present invention in, for example, a antireflection film, concavities and convexities based on the hollow resin particle are produced on the surface of the antireflection film to cause the deterioration of smoothness, and the transparency of the antireflection film may be deteriorated resulting from Rayleigh scattering of the surface of the hollow resin particle to cause images to be whitened. A more preferred upper limit is 70 nm and furthermore preferred upper limit is 50 nm.

In the hollow resin particle of the second present invention, a preferred upper limit of refractive index is 1.40. If it is more than 1.40, in the case of using the hollow resin particle of the second present invention for, for example, an antireflection film, a sufficient effect of preventing incident light such as external light from reflecting may be not attained and a thickness of the antireflection film required for preventing reflection may become too thick. A more preferred upper limit is 1.35 and a furthermore preferred upper limit is 1.30.

In the hollow resin particle of the second present invention, a preferred upper limit of a CV value of a particle diameter is 20%. If it is more than 20%, a ratio of a coarse particle of 100 nm or more increases and in the case of using the hollow resin particle of the second present invention for, for example, an antireflection film, the transparency and smoothness of the antireflection film may be deteriorated. A more preferred upper limit is 15%.

Such the hollow resin particle of the second present invention can be suitably produced by a method in which a lipophilic reaction component A, a hydrophilic reaction component B and a lipophilic reaction component C not reacting with the lipophilic reaction component A and the hydrophilic reaction component B, described later, are used. The outermost layer of the hollow resin particle of the second present invention produced by such a method is composed of a resin obtained by a reaction of the above lipophilic reaction component A and the above hydrophilic reaction component B, and the inner layer is composed of a resin obtained by a reaction of the above lipophilic reaction component C not reacting with the lipophilic reaction component A and the hydrophilic reaction component B. The hollow resin particle of the second present invention having such a structure can achieve the above-mentioned average particle diameter, hollow rate and refractive index by adjusting the constitutions of the outermost layer and the inner layer.

The above-mentioned lipophilic reaction component A and the above-mentioned hydrophilic reaction component B are not particularly limited and include, for example, substances similar to the lipophilic reaction component A and the hydrophilic reaction component B explained in the description on the hollow resin particle of the present invention described above.

The outermost layer of the hollow resin particle of the second present invention preferably contains at least one species of resin selected from the group consisting of polyurea, polyurethane, polyamide, polyester, nylon and epoxy polymer obtained by a combination of the above lipophilic reaction component A and the above hydrophilic reaction component B.

The outermost layer of the hollow resin particle of the second present invention preferably contains a resin crosslinked by an inorganic component. Such the hollow resin particle of the second present invention has an inorganic matrix in its outermost layer and therefore it has excellent heat resistance and solvent resistance and can prevent effectively a binder component from penetrating into hollows.

Such a resin crosslinked by an inorganic component can be obtained, for example, by reacting an unreacted functional group of a resin contained in the hollow resin particle of the second present invention with a silane coupling agent having an epoxy group, an isocyanate group, a ureido group, an amino group, a mercapto group, or a halogen group within its structure.

The above-mentioned lipophilic reaction component C is not particularly limited as long as it is not reacted with the lipophilic reaction component A and the hydrophilic reaction component B but a radically polymerizable monomer is suitably used in point of wide choice of reaction components, ease of handling and the like.

The above-mentioned radically polymerizable monomer is not particularly limited and includes, for example, alkyl (meth)acrylates such as methyl (meth)acrylate, ethyl (meth)acrylate, propyl (meth)acrylate, butyl (meth)acrylate, cumyl (meth)acrylate, cyclohexyl (meth)acrylate, myristyl (meth)acrylate, palmityl (meth)acrylate, stearyl (meth)acrylate and isobonyl (meth)acrylate, polar group-containing (meth)acrylic monomers such as (meth)acrylonitrile, (meth)acrylamide, (meth)acrylic acid, glycidyl (meth)acrylate, 2-hydroxyethyl (meth)acrylate and 2-hydroxypropyl (meth)acrylate, aromatic vinyl monomers such as styrene, α-methylstyrene, p-methylstyrene and p-chlorostyrene, vinyl esters such as vinyl acetate and vinyl propionate, halogen-containing monomers such as vinyl chloride and vinylidene chloride, monofunctional monomers such as vinylpyridine, 2-acryloyloxyethyl phthalate, itaconic acid, fumaric acid, ethylene, propylene and polydimethylsiloxane macro monomer, and polyfunctional monomers such as ethylene glycol di(meth)acrylate, diethylene glycol di(meth)acrylate, triethylene glycol di(meth)acrylate, 1,6-hexanediol di(meth)acrylate, trimethylolpropane di(meth)acrylate, trimethylolpropane trimethacrylate, ethyleneoxide modified trimethylolpropane trimethacrylate, pentaerithritol tri(meth)acrylate, pentaerithritol tetra(meth)acrylate, dipentaerithritol hexa(meth)acrylate, diallyl phthalate, diallyl maleate, diallyl fumarate, diallyl succinate, triallyl isocyanurate, divinylbenzene, and butadiene.

These lipophilic reaction components C may be used alone or in combination of two or more species.

And, in the hollow resin particle of the second present invention, as the above lipophilic reaction component C, a fluorine-containing monomer may be used. By using the fluorine-containing monomer, it is possible to reduce effectively the refractive index of the hollow resin particle of the second present invention and inhibit a polar medium described later from penetrating into hollows.

The above-mentioned fluorine-containing monomer is not particularly limited and includes, for example, fluoroolefins such as fluoroethylene, vinylidene fluoride, tetrafluoroethylene, hexafluoropropylene and perfluoro-2,2-dimethyl-1,3-dioxole; a part of (meth)acrylic acid or completely fluorinated alkyl ester derivatives, such as trifluoroethyl methacrylate and perfluorooctylethyl (meth)acrylate, represented by the following general formula (1), or a part of (meth)acrylic acid or completely fluorinated vinyl ethers:

[Chem. 1]

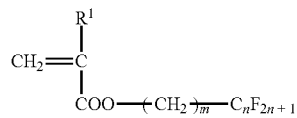

(1)

in the formula, $R^1$ represents a hydrogen atom, a methyl group, or a fluorine atom, and m and n represent a natural number.

When a radically polymerizable monomer is used as the above lipophilic reaction component C, it is preferred to contain a radical polymerization initiator as a reaction catalyst.

The above-mentioned radical polymerization initiator is not particularly limited and includes, for example, various ketone peroxides such as di-t-butylperoxide, dicumyl peroxide, di-t-butylperoxide, di-sec-butylperoxycarbonate, t-butylperoxylaurate, t-butylperoxybenzoate, t-butylperoxy-2-ethylhexanate, t-butylperoxyisopropylmonocarbonate, t-hexylperoxybenzoate, 1,1-bis(t-butylperoxy)-3,5,5-trimethylhexane, 1,1-bis(t-butylperoxy)-2-methylcyclohexane, 1,1-bis(t-butylperoxy)cyclohexane and benzoyl peroxide; organic peroxides such as peroxyketal, hydroperoxide, dialkylperoxide, diacylperoxide, peroxydicarbonate, peroxycarbonate and peroxyester; azo initiators such as 2,2'-azobis(4-methoxy-2,4-dimethylvaleronitrile), 2,2'-azobis(2,4-dimethylvaleronitrile), 2,2'-azobis(2-methylpropionitrile), 2,2'-azobis(2-methylbutyronitrile), 1,1'-azobis(cyclohexane-1-carbonitrile), 2,2'-azobis[N-(2-propenyl)-2-methylpropionamide], 2,2'-azobis(N-butyl-2-methylpropionamide), 2,2'-azobis(N-cyclohexyl-2-methylpropionamide), dimethyl-2,2'-azobis(2-methylpropionate), 2,2'-azobis(2,4,4-trimethylpentane), VPS-0501 (trade name, Wako Pure Chemical Industries, Ltd.) and VPS-1001 (trade name, Wako Pure Chemical Industries, Ltd.); and redox initiators.

By using the above-mentioned compounds as the above lipophilic reaction component C, the hollow resin particle of the second present invention has a low refractive index.

An amount of the above lipophilic reaction component C to be mixed is not particularly limited, but a preferred lower limit is 1 parts by weight with respect to 100 parts by weight of the above lipophilic reaction component A and a preferred upper limit is 1000 parts by weight. If it is less than 1 parts by weight, it may be impossible to sufficiently impart desired hermetic property, refractive index, polarity and crystal property to a hollow resin particle to be obtained, and if it is more than 1000 parts by weight, the shape of a particle cannot be maintained and therefore there may be cases where the hollow resin particle cannot be obtained or the strength of the hollow resin particle to be obtained is extremely low.

In the hollow resin particle of the second present invention, the above outermost layer and the above inner layer tightly adheres to each other. This can be recognized by an electron microscope ("JEM-1200EXII" manufactured by JEOL Ltd.) and the like.

Such the hollow resin particle of the second present invention can be suitably produced by a method which comprises: a step of preparing a dispersion obtained by dispersing a polymerizable droplet containing a lipophilic reaction component A and a lipophilic reaction component C in a polar medium containing a hydrophilic reaction component B; a step of reacting the lipophilic reaction component A on a surface of the polymerizable droplet with the hydrophilic reaction component B in the polar medium to form an outermost layer on the surface of the polymerizable droplet; and a step of reacting the lipophilic reaction component C within the polymerizable droplet to form an inner layer.

Such a method of producing the hollow resin particle of the second present invention also constitutes the present invention.

Hereinafter, such a production method is also referred to as a method of producing the hollow resin particle of the second present invention.

A method of producing the hollow resin particle of the second present invention comprises a step of preparing a dispersion obtained by dispersing a polymerizable droplet containing the lipophilic reaction component A and the lipophilic reaction component C in a polar medium containing the hydrophilic reaction component B.

A procedure of preparing the above-mentioned dispersion is not particularly limited, and the above hydrophilic reaction component B may be added to the above polar medium and then in this mixed polar medium, the polymerizable droplets containing the above lipophilic reaction component A and the above lipophilic reaction component C may be dispersed, or the polymerizable droplets containing the above lipophilic reaction component A and the above lipophilic reaction component C may be dispersed in the above polar medium and then to this dispersion, the above hydrophilic reaction component B may be added.

The above-mentioned polar medium is not particularly limited and mediums used in usual suspension polymerization and the like such as water, ethanol, methanol and isopropyl alcohol can be used. Further, when the above lipophilic reaction component A is polyisocyanate, water and/or alcohol itself, used as a polar medium, also performs a function as a hydrophilic reaction component B.

A method of preparing the above-mentioned dispersion is not particularly limited and for example, by using an emulsifier having high shearing force, a dispersion of a polymerizable droplet having a particle size of the order of nanometer can be suitably prepared. Such an emulsifier having high shearing force includes, for example, an omni mixer, an ultrasonic homogenizer, and a microfluidizer.

When the above dispersion is prepared, various additives may be added to the above polar medium, and these additives include, for example, anionic emulsifiers such as sodium lauryl sulfate, sodium higher alcohol sulfate, triethanolamine lauryl sulfate, ammonium lauryl sulfate, sodium polyoxyethylene lauryl ether sulfate, sodium polyoxyethylene alkyl ether sulfate, triethanolamine polyoxyethylene alkyl ether sulfate, sodium dodecylbenzene sulfonate, sodium alkylnaphthalene sulfonate, sodium dialkyl sulfosuccinates, sodium alkyl diphenyl ether disulfonate, potassium polyoxyethylene alkyl ether phosphate, dipotassium alkenyl succinate and sodium alkane sulfonate, nonionic emulsifiers such as polyoxyethylene lauryl ether, polyoxyethylene cetyl ether, polyoxyethylene stearyl ether, polyoxyethylene oleyl ether, polyoxyethylene myristyl ether, polyoxyethylene alkyl ether, polyoxyethylene higher alcohol ether, polyoxyethylene alkylene alkyl ether, polyoxyethylene distyrenated phenyl ether, sorbitan monolaurate, sorbitan monopalmitate, sorbitan monostearate, sorbitan tristearate, sorbitan monooleate, sorbitan trioleate, polyoxyethylene sorbitan monolaurate, polyoxyethylene sorbitan laurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, glycerol monostearate, glycerol monostearate and glycerol monooleate, cationic emulsifiers such as lauryltrimethylammonium chloride, stearyltrimethylammonium chloride, cetyltrimethylammonium chloride, stearyltrimethylammonium chloride, distearyldimethylammonium chloride and alkylbenzylmethylammonium chloride, amphoteric emulsifiers such as lauryl betaine, stearyl betaine, 2-alkyl-N-carboxymethyl-N-hydroxyethyl imidazolinium betaine and lauryl dimethyl amine oxide, high polymer dispersants such as partially saponified polyvinyl acetate, cellulose derivatives, poly(meth)acrylic acid, poly(meth)acrylic copolymer, polyvinylpyrrolidone, polyacrylamide, MALIALIM and polystyrene sulfonic acid, and dispersion aids such as cetyl alcohol.

The above-mentioned polymerizable droplet is obtained by dissolving the above lipophilic reaction component A and the above lipophilic reaction component C uniformly. A method of producing the above polymerizable droplet is not particularly limited and includes, for example, a method in which the above lipophilic reaction component A and the above lipophilic reaction component C and another lipophilic reaction components such as the above radical polymerization initiator added as required are weighed and mixed and then'stirred until they are uniformly dissolved.

It is preferred to add a non-polymerizable compound to the above polymerizable droplet.

The above-mentioned non-polymerizable compound has the function of forming stable polymerizable droplets in a polar medium or controlling a rate of reaction between the lipophilic reaction component A and the hydrophilic reaction component B. And, by adding the non-polymerizable compound to the above polymerizable droplet, the above non-polymerizable compound (and an unreacted lipophilic reaction component A) is encapsulated in a resin particle prepared by a step described later, and by removing the non-polymerizable compound (and an unreacted lipophilic reaction component A) from such a resin particle, a hollow resin particle having high hollow rate can be produced.

The above-mentioned non-polymerizable compound is not particularly limited as long as it is liquid at a temperature of a reaction of the above lipophilic reaction component A and the above hydrophilic reaction component B, can be mixed with but is not reacted with the lipophilic reaction component A and the lipophilic reaction component C, and can be transpired easily upon heating, and it includes, for example, organic solvents such as butane, pentane, hexane, cyclohexane, toluene, xylene, octane, nonane, decane, undecane, dodecane, tridecane, tetradecane, heptadecane, hexadecane, heptadecane, octadecane, nonadecane, eicosane, ethyl acetate, methyl ethyl ketone, methyl isobutyl ketone, methyl amyl ketone, diisobutyl ketone, methyl chloride, methylene chloride, chloroform, and carbon tetrachloride.

The above-mentioned non-polymerizable compound may be used alone or in combination of two or more species.

Since higher alkanes having about 8 to 20 carbon atoms or long chain hydrophobic compounds, such as octane, nonane, decane, undecane, dodecane, tridecane, tetradecane, heptadecane, hexadecane, heptadecane, octadecane, nonadecane and eicosane of the above-mentioned non-polymerizable compounds, can inhibit effectively the coalescence of polymerizable droplets in a polar medium, if these non-polymerizable compounds are used appropriately in combination with a non-polymerizable compound other than theses compounds, polymerizable droplets having a particle size of the order of nanometer can be stably formed.

An amount of the above non-polymerizable compound to be mixed is not particularly limited, but a preferred lower limit of the above amount is 10 parts by weight with respect to 90 parts by weight of the above lipophilic reaction component A and the above lipophilic reaction component C and a preferred upper limit is 1000 parts by weight. If it is less than 10 parts by weight, the hollow rate of a hollow resin particle to be obtained becomes low and it may be impossible to realize an adequate refractive index, and if it is more than 1000 parts by weight, the shape of a particle cannot be maintained when the non-polymerizable compound is removed and therefore there may be cases where the hollow resin particle cannot be obtained or the strength of a hollow resin particle to be obtained is extremely low.

When higher alkane having about 8 to 20 carbon atoms or a long chain hydrophobic compound is used in combination with a non-polymerizable compound other than these compounds for the purpose of forming polymerizable droplets having a particle size of the order of nanometer stably, the mixing proportion preferably has a lower limit of 0.1 parts by weight with respect to 100 parts by weight of the total of the lipophilic reaction component A, the lipophilic reaction component C and the non-polymerizable compound. If it is less than 0.1 parts by weight, it may be impossible to inhibit the coalescence of polymerizable droplets effectively.

The method of producing the hollow resin particle of the second present invention comprises a step of reacting the above lipophilic reaction component A on a surface of the above polymerizable droplet with the above hydrophilic reaction component B in the above polar medium to form an outermost layer on the surface of the above polymerizable droplet.

By heating the above-mentioned dispersion to a temperature at which a reaction of the above lipophilic reaction component A and the above hydrophilic reaction component B is initiated, it is possible to react the above lipophilic reaction component A with the above hydrophilic reaction component B to produce a resin.

In this case, since the above polymerizable droplet containing the lipophilic reaction component A and the above polar medium containing the hydrophilic reaction component B are phase-separating, the reaction occurs only in the vicinity of the interface between the above polymerizable droplet and the above polar medium and the resin particle, which has an outermost layer comprising the produced resin and contains the lipophilic reaction component C in its inside, is formed.

The method of producing the hollow resin particle of the second present invention comprises a step of reacting the above lipophilic reaction component C within the above polymerizable droplet to form an inner layer.

By heating the above-mentioned dispersion to a temperature at which a reaction of the above lipophilic reaction component C is initiated, the above lipophilic reaction component C can be reacted.

Since the reaction of above lipophilic reaction component A and the above hydrophilic reaction component B occurs only in the vicinity of the interface between the above polymerizable droplet and the above polar medium and produces an outermost layer, the resin produced by a reaction of the above lipophilic reaction component C forms an inner layer and therefore a hollow resin particle having a composite shell comprising two resin layers of the outermost layer and the inner layer is produced.

In addition, the step of forming the above inner layer can be carried out in any time before, during, or after the step of forming the above outermost layer by controlling reaction conditions with the above reaction catalyst and the like.

In such the method of producing the hollow resin particle of the second present invention, an unreacted lipophilic reaction component A and an unreacted lipophilic reaction component C may be encapsulated in the hollow resin particle to be produced. In this case, the method of producing the hollow resin particle of the second present invention preferably further comprises a step of removing the above encapsulated unreacted lipophilic reaction component A and the above encapsulated unreacted lipophilic reaction component C.

A method of removing the unreacted lipophilic reaction component A and the unreacted lipophilic reaction component C, encapsulated in the above resin particle is not particularly limited and includes, for example, a method of blowing gas such as nitrogen or air in a dispersion of the obtained hollow resin particle, a method of heating the hollow resin particle above the boiling points of the unreacted lipophilic reaction component A and the unreacted lipophilic reaction component C, a method of reducing a pressure of a whole system, and a method of extracting the unreacted lipophilic reaction component A and the unreacted lipophilic reaction component C with a solvent.

The solvent used in the above extraction is not particularly limited as long as it is a solvent compatible with the lipophilic reaction component A and the lipophilic reaction component C but the non-polymerizable compound described above is suitably used.

In addition, by this step, a solvent and the like encapsulated in the above resin particle can also be removed.

In accordance with such the method of producing the hollow resin particle of the second present invention, it is possible to produce suitably the hollow resin particle of the second present invention having a single hollow structure and a composite shell comprising at least two resin layers of an outermost layer and an inner layer, a hollow rate being 30% or more.

An organic-inorganic hybrid particle, which has an organic matrix and an inorganic matrix, a refractive index being 1.40 or less (hereinafter, also referred to as a hybrid particle of the present invention), also constitutes the present invention. Such a hybrid particle of the present invention has high alkali resistance by virtue of a network of an organic matrix. Therefore, for example, in an antireflection film prepared by using such a hybrid particle of the present invention, even when a commercially available alkali detergent was used for wiping out soil, the hybrid particle of the present invention contained in the antireflection film is not dissolved in the alkali detergent and the performance as an antireflection film was not deteriorated. And, the hybrid particle of the present invention has excellent heat resistance and solvent resistance by virtue of having an inorganic matrix, and the hybrid particle of the present invention can prevent effectively a hollow from constricting due to the softening of a particle matrix by a solvent and a binder component from penetrating into hollows at the time of using a solvent in a film formation even though the hybrid particle of the present invention has a hollow structure having a hollow in its inside described later when an antireflection film is prepared using such a hybrid particle of the present invention. Further, the refractive index can be effectively reduced since the particle having an air phase (a refractive index equals 1.00) in its inside, and therefore, for example, the refractive index of an antireflection film obtained by using the coating agent containing such a hybrid particle having a low refractive index can also be decreased.

An upper limit of refractive index of the hybrid particle of the present invention is 1.40. If it is more than 1.40, in the case of using the hybrid particle of the present invention for, for example, an antireflection film, a sufficient effect of preventing incident light such as external light from reflecting cannot be attained and a thickness of the antireflection film required for preventing reflection becomes too thick. A preferred upper limit is 1.35 and a more preferred upper limit is 1.30.

Such a hybrid particle of the present invention preferably has a hollow structure having a hollow in its inside. By having the hollow in the inside, a low refractive index of the hybrid particle of the present invention becomes lower.

When the hybrid particle of the present invention has a hollow in its inside, a preferred lower limit of a hollow rate is 30%. If it is less than 30%, it may be impossible to realize an adequately low refractive index. An preferred upper limit of the hollow rate is not particularly limited but a preferred upper limit of the hollow rate is 95% and a more preferred upper limit is 70% since it is necessary to maintain the shape and secure the certain degree of strength of the hollow resin particle.

A method of synthesizing a hybrid particle having such a hollow structure is not particularly limited and includes, for example, emulsion polymerization in which a polymerizable silane coupling agent having a vinyl group within its structure and a non-polymerizable organic solvent are used, dropwise-type emulsion polymerization, soap-free polymerization, micro emulsion polymerization, mini emulsion polymerization, and micro suspension polymerization; and interfacial polymerization in which a silane coupling agent having an epoxy group, an isocyanate group, a ureido group, an amino group, a mercapto group, or a halogen group within its structure is employed, and it can be synthesized using an appropriate polymerization method.

The above-mentioned polymerizable silane coupling agent having a vinyl group within the structure is not particularly limited and includes, for example, vinyltrichlorosilane, vinyltrimethoxysilane, vinyltriethoxysilane, p-styrylmethoxysilane, 3-methacryloxypropyldimethoxysilane, 3-methacryloxypropyltrimethoxysilane, 3-methacryloxypropylmethyldiethoxysilane, 3-methacryloxypropyltriethoxysilane and 3-acryloxypropyltrimethoxysilane. These polymerizable silane coupling agents having a vinyl group within the structure may be used alone or in combination of two or more species as a mixture with any polymerizable monomer.

The above-mentioned polymerizable monomer is not particularly limited and as a monofunctional monomer, alkyl (meth)acrylates such as methyl (meth)acrylate, ethyl (meth)acrylate, propyl (meth)acrylate, butyl (meth)acrylate, cumyl (meth)acrylate, cyclohexyl (meth)acrylate, myristyl (meth)acrylate, palmityl (meth)acrylate, stearyl (meth)acrylate and isobonyl (meth)acrylate; polar group-containing (meth) acrylic monomers such as (meth)acrylonitrile, (meth)acrylamide, (meth)acrylic acid, glycidyl (meth)acrylate, 2-hydroxyethyl (meth)acrylate and 2-hydroxypropyl (meth) acrylate; aromatic vinyl monomers such as styrene, α-methylstyrene, p-methylstyrene and p-chlorostyrene; vinyl esters such as vinyl acetate and vinyl propionate; halogen-containing monomers such as vinyl chloride and vinylidene chloride; vinylpyridine, 2-acryloyloxyethyl phthalate, itaconic acid, fumaric acid, ethylene, propylene and polydimethylsiloxane macro monomer are given.

A polyfunctional monomer of the above-mentioned polymerizable monomer is not particularly limited and includes, for example, di(meth)acrylate, tri(meth)acrylate, a diaryl or triaryl compound and a divinyl compound. These monomers may be used alone or in combination of two or more species. Incidentally, the above-mentioned polyfunctional monomer is added for the purpose of raising a glass transition temperature (Tg) of the above-mentioned hybrid particle and improving heat resistance and solvent resistance.

The above-mentioned di(meth)acrylate is not particularly limited and includes, for example, ethylene glycol di(meth) acrylate, diethylene glycol di(meth)acrylate, triethylene glycol di(meth)acrylate, 1,6-hexanediol di(meth)acrylate and trimethylolpropane di(meth)acrylate.

The above-mentioned tri(meth)acrylate is not particularly limited and includes, for example, trimethylolpropane tri (meth)acrylate, ethyleneoxide modified trimethylolpropane tri(meth)acrylate and pentaerithritol tri(meth)acrylate.

The above-mentioned diaryl or triaryl compound is not particularly limited and includes, for example, pentaerithritol tetra(meth)acrylate, dipentaerithritol hexa(meth)acrylate, diallyl phthalate, diallyl maleate, diallyl fumarate, diallyl succinate and triallyl isocyanurate.

The above-mentioned divinyl compound is not particularly limited and includes, for example, divinylbenzene and butadiene.

The above-mentioned non-polymerizable organic solvent is not particularly limited as long as it is miscible with the above polymerizable silane coupling agent having a vinyl group within a structure and it is liquid at a polymerization temperature, but for example, organic solvents such as butane, pentane, hexane, cyclohexane, heptane, decane, hexadecane, toluene, xylene, ethyl acetate, methyl ethyl ketone, methyl isobutyl ketone, 1,4-dioxane, methyl chloride, methylene chloride, chloroform, and carbon tetrachloride are suitable.

The above-mentioned silane coupling agent having a an epoxy group within a structure is not particularly limited and includes, for example, 2-(3,4-epoxycyclohexyl)-ethyltrimethoxysilane, 3-glycidoxypropyltrimethoxysilane, 3-glycidoxypropylmethyldiethoxysilane, and 3-glycidoxypropyltriethoxysilane.

The above-mentioned silane coupling agent having an isocyanate group within a structure is not particularly limited and includes, for example, 3-isocyanatepropyltriethoxysilane.

The above-mentioned silane coupling agent having a ureido group within a structure is not particularly limited and includes, for example, 3-ureidopropyltriethoxysilane.

The above-mentioned silane coupling agent having an amino group within a structure is not particularly limited and includes, for example, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butyliden) propylamine, N-phenyl-3-aminopropyltrimethoxysilane, N-(vinylbenzyl)-2-aminoethyl-3-aminopropyltrimethoxysilane hydrochloride, and special aminosilane.

The above-mentioned silane coupling agent having a mercapto group within a structure is not particularly limited and includes, for example, 3-mercaptopropylmethyldimethoxysilane and 3-mercaptopropyltrimethoxysilane.

The above-mentioned silane coupling agent having a halogen group within a structure is not particularly limited and includes, for example, 3-chloropropyltrimethoxysilane.

These interfacially polymerizable silane coupling agents may be used alone or in combination of two or more species as a mixture with any interfacial polymerization reactive material, an epoxy prepolymer, isocyanate, amine, halide, polymercaptan, or polychloride.

When the above silane coupling agent is used as a mixture with the above interfacial polymerization reactive material, the above silane coupling agent may be added in the early stages of a reaction of the above interfacial polymerization reactive material or may be added in the later stages of a reaction of the above interfacial polymerization reactive material. When the above silane coupling agent is added in the later stages of a reaction of the above interfacial polymerization reactive material, a resin constituting the hybrid particle of the present invention to be obtained have a structure crosslinked with the above silane coupling agent.

The above-mentioned epoxy prepolymer has a lipophilic property and reacts with amine, polycarboxylic acid, acid anhydride, polythiol, or a phenol resin to give a resin.

The above epoxy prepolymer is not particularly limited and includes, for example, a bisphenol A type, a resorcin type, a bisphenol F type, a tetraphenylmethane type, a novolac type, a polyalcohol type, a polyglycol type, a glycerin triether type, a glycidyl ether type, a glycidyl ester type, a glycidylamine type, an aliphatic type, an alicyclic type, an aminophenol type, a hydantoin type, an isocyanurate, a biphenol type, a naphthalene type, and a hydrogenated compound and a fluorinated compound thereof.

An epoxy equivalent weight of such an epoxy prepolymer is not particularly limited but a preferred upper limit thereof is 500. By using an epoxy prepolymer, an epoxy equivalent weight of which has an upper limit of 500, a resin which has a high degree of crosslinking and is superior in heat resistance, solvent resistance and strength can be obtained. A more preferred upper limit of the epoxy equivalent weight is 200.

An epoxy prepolymer, an epoxy equivalent weight of which has an upper limit of 200, is not particularly limited and includes, for example, bisphenol A type epoxy resins such as EPOTOHTO YD-115, EPOTOHTO YD-127, EPOTOHTO YD-128 (trade name, all produced by Tohto Kasei Co., Ltd.), Epikote 825, Epikote 827, Epikote 828 (trade name, all produced by Japan Epoxy Resins Co., Ltd.), EPICLON 840, and EPICLON 850 (trade name, all produced by DAINIPPON INK AND CHEMICALS, INCORPORATED); bisphenol F type epoxy resins such as EPOTOHTO YDF-170, EPOTOHTO YDF-175S (trade name, all produced by Tohto Kasei Co., Ltd.), Epikote 806, Epikote 807 (trade name, all produced by Japan Epoxy Resins Co., Ltd.), EPICLON 830, and EPICLON 835 (trade name, all produced by DAINIPPON INK AND CHEMICALS, INCORPORATED); novolac type epoxy resins such as EPOTOHTO YDPN-638, EPOTOHTO YDCN-701, EPOTOHTO YDCN-702, EPOTOHTO YDCN-703, EPOTOHTO YDCN-704, EPOTOHTO YDCN-500 (trade name, all produced by Tohto Kasei Co., Ltd.), Epikote 152, Epikote 154 (trade name, all produced by Japan Epoxy Resins Co., Ltd.), EPICLON N-655, EPICLON N-740, EPICLON N-770, EPICLON N-775, and EPICLON N-865 (trade name, all produced by DAINIPPON INK AND CHEMICALS, INCORPORATED); special polyfunctional type epoxy resins such as EPOTOHTO YH-434, EPOTOHTO YH-434L (trade name, all produced by Tohto Kasei Co., Ltd.), Epikote 1031S, Epikote 1032H60, Epikote 604, Epikote 630 (trade name, all produced by Japan Epoxy Resins Co., Ltd.), EPICLON 430 (trade name, produced by DAINIPPON INK AND CHEMICALS, INCORPORATED), TETRAD-X, and TETRAD-C (trade name, all produced by Mitsubishi Gas Chemical Co., Ltd.); biphenyl type epoxy resins such as Epikote YX4000, Epikote YL6121H, Epikote YL6640, and Epikote YL6677 (trade name, all produced by Japan Epoxy Resins Co., Ltd.); aliphatic polyglycidyl ether type epoxy resins such as EPOTOHTO YH-300, EPOTOHTO YH-301, EPOTOHTO YH-315, EPOTOHTO YH-324, and EPOTOHTO YH-325 (trade name, all produced by Tohto Kasei Co., Ltd.); crystalline epoxy resins such as EPOTOHTO YDC-1312, and EPOTOHTO YSLV-80XY (trade name, all produced by Tohto Kasei Co., Ltd.); naphthalene type epoxy resins such as EPICLON HP-4032, and EPICLON EXA-4700 (trade name, all produced by DAINIPPON INK AND CHEMICALS, INCORPORATED); special functional type epoxy resins such as Epikote 191P, Epikote YX310 (trade name, all produced by Japan Epoxy Resins Co., Ltd.), and EPICLON HP-820 (trade name, produced by DAINIPPON INK AND CHEMICALS, INCORPORATED); and reactive diluents such as EPICLON 725 (trade name, produced by DAINIPPON INK AND CHEMICALS, INCORPORATED).

And, an epoxy prepolymer having an epoxy equivalent weight of more than 200 and 500 or less is not particularly limited and includes, for example, bisphenol A type epoxy resins such as EPOTOHTO YD-134, EPOTOHTO YD-011 (trade name, all produced by Tohto Kasei Co., Ltd.), Epikote 801, Epikote 1001 (trade name, all produced by Japan Epoxy Resins Co., Ltd.), EPICLON 860, EPICLON 1050, and EPICLON 1055 (trade name, all produced by DAINIPPON INK AND CHEMICALS, INCORPORATED); bisphenol F type epoxy resins such as EPOTOHTO YDF-2001 (trade name, produced by Tohto Kasei Co., Ltd.); novolac type epoxy resins such as EPICLON N-660, EPICLON N-665, EPICLON N-670, EPICLON N-673, EPICLON N-680, and EPICLON N-695 (trade name, all produced by DAINIPPON INK AND CHEMICALS, INCORPORATED); special polyfunctional type epoxy resins such as Epikote 157S70 (trade name, produced by Japan Epoxy Resins Co., Ltd.), and EPICLON 5500 (trade name, produced by DAINIPPON INK AND CHEMICALS, INCORPORATED); brominated epoxy resins such as EPOTOHTO YDB-360, EPOTOHTO YDB-400, EPOTOHTO YDB-405 (trade name, all produced by Tohto Kasei Co., Ltd.), EPICLON 152, and EPICLON 153 (trade name, all produced by DAINIPPON INK AND CHEMICALS, INCORPORATED); flexible epoxy resins such as EPOTOHTO YD-171 (trade name, produced by Tohto Kasei Co., Ltd.), Epikote 871 (trade name, produced by Japan Epoxy Resins Co., Ltd.), EPICLON TSR-960, and EPICLON TSR-601 (trade name, all produced by DAINIPPON INK AND CHEMICALS, INCORPORATED); hydrogenated type epoxy resins such as EPOTOHTO ST-3000 (trade name, produced by Tohto Kasei Co., Ltd.), Epikote YX8000, and Epikote YX8034 (trade name, all produced by Japan Epoxy Resins Co., Ltd.); and dicyclopentadiene type epoxy resins such as EPICLON HP-7200 (trade name, produced by DAINIPPON INK AND CHEMICALS, INCORPORATED).

These epoxy prepolymers may be used alone or in combination of two or more species.

In addition, an epoxy prepolymer having an epoxy equivalent weight of more than 500 includes, for example, bisphenol A type epoxy resins such as EPOTOHTO YD-012; EPOTOHTO YD-013, EPOTOHTO YD-014, EPOTOHTO YD-017, EPOTOHTO YD-019 (trade name, all produced by Tohto Kasei Co., Ltd.), Epikote 1002, Epikote 1003, Epikote 1055, Epikote 1004, Epikote 1007, Epikote 1009, Epikote 1010 (trade name, all produced by Japan Epoxy Resins Co., Ltd.), EPICLON 3050, EPICLON 4050, EPICLON AM-020-P, EPICLON AM-030-P, EPICLON AM-040-P, EPICLON 7050, EPICLON HM-091, and EPICLON HM-101 (trade name, all produced by DAINIPPON INK AND CHEMICALS, INCORPORATED); bisphenol F type epoxy resins such as EPOTOHTO YDF-2004 (trade name, produced by Tohto Kasei Co., Ltd.), Epikote 4004P, Epikote 4007P, Epikote 4010P, Epikote 4110, and Epikote 4210 (trade name, all produced by Japan Epoxy Resins Co., Ltd.); brominated epoxy resins such as EPOTOHTO YDB-405 (trade name, produced by Tohto Kasei Co., Ltd.), and EPICLON 1123P-75M (trade name, produced by DAINIPPON INK AND CHEMICALS, INCORPORATED); flexible epoxy resins such as EPOTOHTO YD-172 (trade name, produced by Tohto Kasei Co., Ltd.), Epikote 872 (trade name, produced by Japan Epoxy Resins Co., Ltd.), and EPICLON 1600-75X (trade name, produced by DAINIPPON INK AND CHEMICALS, INCORPORATED); hydrogenated type epoxy resins such as EPOTOHTO ST-4000D (trade name, produced by Tohto Kasei Co., Ltd.); and polyfunctional type epoxy resins such as EPICLON 5800 (trade name, produced by DAINIPPON INK AND CHEMICALS, INCORPORATED).

The above-mentioned isocyanate is not particularly limited and includes, for example, biuret type, adduct type and isocyanurate type isocyanates.

The above-mentioned amine is not particularly limited and includes, for example, aliphatic amines such as ethylenediamine and adducts thereof, diethylenetriamine, dipropylenetriamine, triethylenetetramine, tetraethylenepentamine, dimethylaminopropylamine, diethylaminopropylamine, dibutylaminopropylamine, hexamethylenediamine and modified products thereof, N-aminoethylpiperazine, bis-aminopropylpiperazine, trimethylhexamethylenediamine, bishexamethylenetriamine, dicyandiamide, diacetoacrylamide, various modified aliphatic polyamines and polyoxypropylenediamine; alicyclic amines and modified products thereof such as 3,3'-dimethyl-4,4'-diaminodicyclohexylmethane, 3-amino-1-cyclohexylaminopropane, 4,4'-diaminodicyclohexylmethane, isophorone diamine, 1,3-bis(aminomethyl)cyclohexane and N-dimethylcyclohexylamine; aromatic amines and modified products thereof such as 4,4'-diaminodiphenylmethane(methylenedianiline), 4,4'-diaminodiphenyl ether, diaminodiphenyl sulfone, m-phenylenediamine, 2,4'-toluilenediamine, m-toluilenediamine, o-toluilenediamine, methaxylylenediamine and xylylenediamine; polyamidoamines such as modified products of another special amines, amidoamines and amino polyamide resin; tertiary amines and complex compounds thereof such as dimethylaminomethylphenol, 2,4,6-tri(dimethylaminomethyl)phenol and tri-2-ethylhexanoate salt of tri(dimethylaminomethyl)phenol; imidazoles such as ketimine, 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 1-cyanoethyl-2-methylimidazole, 1-cyanoethyl-2-undecylimidazole, 1-cyanoethyl-2-isopropylimidazole, 1-cyanoethyl-2-phenylimidazole, 1-cyanoethyl-2-methylimidazole trimelitate, 1-cyanoethyl-2-undecylimidazole trimelitate, 1-cyanoethyl-2-phenylimidazole trimelitate, 2,4-diamino-6-[2'-methylimidazolyl-(1)']-ethyl-s-triazine, 2,4-diamino-6-[2'-undecylimidazolyl-(1)']-ethyl-s-triazine, 2,4-diamino-6-[2'-ethyl-4'-methylimidazolyl-(1)']-ethyl-s-triazine, 1-dodecyl-2-methyl-3-benzylimidazoliumchloride, 1,3-dibenzyl-2-methylimidazoliumchloride, 2-phenyl-4-methyl-5-hydroxymethylimidazole, 2-phenyl-4,5-dihydroxymethylimidazole, 1-cyanoethyl-2-phenyl-4,5-di(cyanoethoxymethyl)imidazole, a composite of 2-methylimidazole and triazine and a composite of 2-phenylimidazole and triazine; hydrazides such as isophthalic dihydrazide, adipic dihydrazide and sebacic dihydrazide; and amino group-containing prepolymers such as amino adducts of epoxy resin.

The above-mentioned halide is not particularly limited and includes, for example, dibasic acid halide such as adipoyl dichloride, phthaloyl dichloride, terephthaloyl dichloride and 1,4-cyclohexanedicarbonyl chloride.

By dispersing the above-mentioned hollow resin particle of the present invention and of the second present invention and the above-mentioned hybrid particle of the present invention (hereinafter, these are also referred to as a particle according to the present invention collectively) in an appropriate binder, an antireflective resin composition for producing an antireflection film and the like can be produced. Such an antireflective resin composition containing a particle according to the present invention also constitutes the present invention.

The above-mentioned binder in which the particles according to the present invention are dispersed is not particularly limited as long as it is a transparent material capable of forming a film and it includes, for example, organic materials such as a resin, inorganic materials and polymerizable monomer solutions.

The above-mentioned organic material is not particularly limited and includes, for example, cellulose derivatives such as triacetylcellulose, diacetyl cellulose, propionyl cellulose, butanoyl cellulose, acetyl propionyl cellulose acetate and nitrocellulose; polyamide, polycarbonate; polyesters such as polyethylene terephthalate, poly-1,4-cyclohexanedimethylene terephthalate, polyethylene-1,2-diphenoxyethane-4,4-dicarboxylate, polybutylene terephthalate and polyethylene naphthalate; polystyrene, polypropylene, polyethylene, polymethyl pentene, polysulfone, polyether sulfone, polyallylate, polyether imide, polymethyl methacrylate, or transparent resins with relatively low refractive index such as various fluorine-containing products thereof.

Further, a transparent resin is used as the above binder, a transparent resin having a glass transition temperature lower than that of the hollow resin particle of the present invention is preferably used. Thereby, sufficient film strength can be attained.

The above-mentioned inorganic material is not particularly limited and includes, for example, alkoxides of various elements, salt of an organic acid and coordination compounds joined to a coordinating compound, and specifically it includes, for example, metal alcoholate compounds such as titanium tetraethoxide, titanium tetra-i-propoxide, titanium tetra-n-propoxide, titanium tetra-n-butoxide, titanium tetra-sec-butoxide, titanium tetra-tert-butoxide, aluminum triethoxide, aluminum tri-i-propoxide, aluminum tributoxide, antimony triethoxide, antimony tributoxide, zirconium tetraethoxide, zirconium tetra-i-propoxide, zirconium tetra-n-propoxide, zirconium tetra-n-butoxide, zirconium tetra-sec-butoxide and zirconium tetra-tert-butoxide; chelate compounds such as di-isopropoxytitanium bis-acetylacetonate, di-butoxytitanium bis-acetylacetonate, di-ethoxytitanium bis-acetylacetonate, bis-acetylaceton zirconium, aluminum acetylacetonate, aluminum di-n-butoxidemonoethyl acetoacetate, aluminum di-i-propoxidemonomethyl acetoacetate and zirconium tri-n-butoxidemonoethyl acetoacetate; and active inorganic polymer mainly containing ammonium zirconile carbonate or zirconium.

A polymerizable monomer solution in the above-mentioned polymerizable monomer solution is not particularly limited as long as it is transparent and it includes, for example, alkyl (meth)acrylates such as methyl (meth)acrylate, ethyl (meth)acrylate, propyl (meth)acrylate, butyl (meth)acrylate, cumyl (meth)acrylate, cyclohexyl (meth)acrylate, myristyl (meth)acrylate, palmityl (meth)acrylate, stearyl (meth)acrylate and isobonyl (meth)acrylate; polar group-containing (meth)acrylic monomers such as (meth)acrylonitrile, (meth)acrylamide, (meth)acrylic acid, glycidyl (meth)acrylate, 2-hydroxyethyl (meth)acrylate and 2-hydroxypropyl (meth)acrylate; aromatic vinyl monomers such as styrene, α-methylstyrene, p-methylstyrene and p-chlorostyrene; vinyl esters such as vinyl acetate and vinyl propionate; halogen-containing monomers such as vinyl chloride and vinylidene chloride; vinylpyridine, 2-acryloyloxyethyl phthalate, itaconic acid, fumaric acid, ethylene and propylene.

These monomers may be used alone or in combination of two or more species.

The above-mentioned polymerizable monomer solution may contain a polyfunctional monomer for the purpose of improving film strength.

The above-mentioned polyfunctional monomer is not particularly limited and includes, for example, di(meth)acrylates such as ethylene glycol di(meth)acrylate, diethylene glycol di(meth)acrylate, triethylene glycol di(meth)acrylate, 1,6-hexanediol di(meth)acrylate and trimethylolpropane di(meth)acrylate; tri(meth) acrylates such as trimethylolpropane tri(meth)acrylate, ethyleneoxide modified trimethylolpropane tri(meth)acrylate and pentaerithritol tri(meth)acrylate; tetra(meth)acrylates such as pentaerithritol tetra(meth)acrylate; hexa(meth)acrylates such as pentaerithritol hexa(meth)acrylate; diaryl or triaryl compounds such as pentaerithritol tetra(meth)acrylate, dipentaerithritol hexa(meth)acrylate, diallyl phthalate, diallyl maleate, diallyl fumarate, diallyl succinate and triallyl isocyanurate; and divinyl compounds such as divinylbenzene and butadiene.

These polyfunctional monomers may be used alone or in combination of two or more species.

A mixing ratio of the particles according to the present invention and the above binder is not particularly limited, but a preferred lower limit of the amount of the particles according to the present invention to be mixed is 5% by volume and a preferred upper limit is 95% by volume. If it is less than 5% by volume, it may be impossible to reduce adequately the refractive index of, for example, the antireflection film obtained by using the antireflective resin composition of the present invention, and if it is more than 95% by volume, mechanical strength of the above-mentioned antireflection film may be deteriorated. A more preferable lower limit is 30% by volume and a more preferable upper limit is 90% by volume and a furthermore preferable lower limit is 50% by volume and a furthermore preferable upper limit is 80% by volume.

The antireflective resin composition of the present invention may be an emulsion in which the particles according to the present invention is suspended in a binder in the case of using a curable type binder as the above binder, and it may be diluted in a volatile solvent in the case of using any binder other than that as the above binder.

The above-mentioned volatile solvent is not particularly limited but from the viewpoint of the stability, the wettability and the volatility of a composition, for example, alcohols such as methanol, ethanol, isopropanol, butanol and 2-methoxyethanol; ketones such as acetone, methyl ethyl ketone and methyl isobutyl ketone; esters such as methyl acetate, ethyl acetate and butyl acetate; ethers such as diisopropyl ether; glycols such as ethylene glycol, propylene glycol and hexylene glycol; glycol ethers such as ethyl cellosolve, butyl cellosolve, ethyl carbitol and butyl carbitol; aliphatic hydrocarbons such as hexane, heptane and octane; halogenated hydrocarbons; aromatic hydrocarbons such as benzene, toluene and xylene; N-methyl pyrrolidone, and dimethylformamide are suitably used. These volatile solvents may be used alone or in combination of two or more species.

And, the antireflective resin composition of the present invention described above can be used as a coating agent for an antireflection film for producing an antireflection film. A coating agent for an antireflection film comprising such the antireflective resin composition of the present invention also constitutes the present invention.

Further, an antireflection film obtained by using the coating agent for an antireflection film of the present invention also constitutes the present invention.

A method of producing the antireflection film of the present invention is not particularly limited and includes, for example, a method of applying the coating agent for an antireflection film of the present invention onto a release film and the like, or directly onto a transparent substrate and then drying it.

A method of applying the coating agent for an antireflection film of the present invention is not particularly limited and includes, for example, dip coating method, spin coating method, flow coating method, spray coating method, roll coating method, gravure roll coating method, air doctor coating method, blade coating method, wire doctor coating method, knife coating method, reverse roll coating method, transfer roll coating method, microgravure coating method, kiss coating method, cast coating method, slot orifice coating method, calender coating method, and die coating method.

The antireflection film of the present invention can be obtained by applying the coating agent for an antireflection film of the present invention onto a release film and the like, or directly onto a transparent substrate by the methods described above, forming a coat by drying by heating the coating agent and then curing the above-mentioned coat by heating, humidification, ultraviolet irradiation, electron beam irradiation and the like.

In the antireflection film of the present invention, it is preferred that the film's surface is smooth. Incidentally, in the present description, the term that the surface is smooth means that surface roughness Rz determined by a method specified in JIS B 0601 is 0.2 μm or less.

By having the smooth surface, the antireflection film of the present invention does not look whitish as a whole due to the diffuse reflection of light on the surface and soil such as fingerprints, sebum, sweat and cosmetics is hardly adhered to the surface and the adherent soil once can be easily removed.

The antireflection film of the present invention may further have a base layer in addition to a layer obtained by using the coating agent for an antireflection film of the present invention. By having the base layer, the mechanical strength of the antireflection film of the present invention is enhanced and the handling property is improved.

The above-mentioned base layer is not particularly limited as long as it is transparent but for example, a substance comprising a transparent resin, which can be used as the above-mentioned binder, is suitable from the viewpoint of moldability and mechanical strength.

A thickness of the antireflection film of the present invention is not particularly limited but a preferred lower limit is 50 nm and a preferred upper limit is 200 nm. If it is less than 50 nm, abrasion resistance may be insufficient, and if it is more than 200 nm, the film may be apt to break.

Further, when the antireflection film of the present invention has the above base layer, a thickness of the base layer is not particularly limited but a preferred lower limit is 3 μm and a preferred upper limit is 7 μm. If it is less than 3 μm, the strength of the antireflection film of the present invention may be deteriorated, and if it is more than 7 μm, the transparency of the antireflection film of the present invention may be deteriorated and internal visual information may hardly be seen.

Effect of the Invention

In accordance with the present invention, it is possible to provide a hollow resin particle, which has excellent dispersibility in a binder component and prevents the diffuse reflection of light and can attain an antireflection layer having high alkali resistance when it is used as a particle constituting an antireflection layer having a low refractive index, an organic-inorganic hybrid particle and a method of producing the hollow resin particle.

BEST MODE FOR CARRYING OUT THE INVENTION

Hereinafter, the present invention will be described in more detail by way of examples, but the present invention is not limited to these examples.

Example 1

(1) Preparation of Hollow Resin Particle

A whole amount of a mixed solution obtained by mixing and stirring 30 parts by weight of DURANATE 21S (produced by Asahi Kasei Chemicals Corporation) as a polyisocyanate component and 70 parts by weight of toluene as a non-polymerizable compound was added to 400 parts by weight of ion-exchange water containing 2 parts by weight of sodium dodecylbenzene sulfonate as a water-soluble emulsifier and 2 parts by weight of cetyl alcohol as a dispersion aid, and the resulting mixture was emulsified forcibly for 60 minutes with an ultrasonic homogenizer to prepare a dispersion in which polymerizable droplets having an average particle diameter of 50 nm were dispersed.

A 20 L polymerizing vessel equipped with a stirrer, a jacket, a reflux condenser, and a thermometer was used and the inside of the vessel was deoxidize by reducing the internal pressure of the polymerizing vessel and replaced with nitrogen to be brought into a nitrogen atmosphere, and then, the obtained dispersion was charged into the vessel and a temperature of the polymerizing vessel was elevated to 80° C. to initiate polymerization. After polymerizing the vessel content for 4 hours and aging it for 1 hour, the polymerizing vessel was cooled to room temperature.

The obtained slurry was dialyzed with a cellulose membrane having a molecular weight cutoff of 10000 to eliminate the excessive surfactants and inorganic salts, and agglomerated particles and insoluble matter were further eliminated by filtration. The obtained resin particles were dried under vacuum to obtain hollow resin particles.

The obtained hollow resin particle was observed with an electron microscope ("S-3500N" manufactured by Hitachi High-Technologies Corporation) and consequently it was found that the shape of the particle was almost spherical.

(2) Preparation of Coating Agent for Antireflection Film and Formation of Antireflection Film 100 parts by volume of the obtained hollow resin particle and 800 parts by volume of toluene as a diluent solvent were mixed in 100 parts by volume of polymethyl methacrylate as a binder to prepare a coating agent for an antireflection film.

The obtained coating agent for an antireflection film was applied onto a triacetylcellulose (TAC) film and dried at 120° C. for 10 minutes to form an antireflection film of 100 nm in thickness.

Example 2

A whole amount of a mixed solution obtained by mixing and stirring 30 parts by weight of DURANATE 21S (produced by Asahi Kasei Chemicals Corporation) as a polyisocyanate component and 70 parts by weight of toluene as a non-polymerizable compound was added to 390 parts by weight of ion-exchange water containing 10 parts by weight of ethyleneglycol as a polyol component, 2 parts by weight of sodium dodecylbenzene sulfonate as a water-soluble emulsifier and 2 parts by weight of cetyl alcohol as a dispersion aid, and the resulting mixture was emulsified forcibly for 60 minutes with an ultrasonic homogenizer to prepare a dispersion in which polymerizable droplets having an average particle diameter of 60 nm were dispersed.

A 20 L polymerizing vessel equipped with a stirrer, a jacket, a reflux condenser, and a thermometer was used and the inside of the vessel was deoxidize by reducing the internal pressure of the polymerizing vessel and replaced with nitrogen to be brought into a nitrogen atmosphere, and then, the obtained dispersion was charged into the vessel and a temperature of the polymerizing vessel was elevated to 80° C. to initiate polymerization. After polymerizing the vessel content for 4 hours and aging it for 1 hour, the polymerizing vessel was cooled to room temperature.

The obtained slurry was dialyzed with a cellulose membrane having a molecular weight cutoff of 10000 to eliminate the excessive surfactants and inorganic salts, and agglomerated particles and insoluble matter were further eliminated by filtration.

The obtained resin particles were dried under vacuum to obtain hollow resin particles.

The obtained hollow resin particle was observed with an electron microscope ("S-3500N" manufactured by Hitachi High-Technologies Corporation) and consequently it was found that the shape of the particle was almost spherical.

A coating agent for an antireflection film was prepared and an antireflection film was formed by following the same method as in Example 1 except for using the obtained hollow resin particle.

Example 3

A whole amount of a mixed solution obtained by mixing and stirring 30 parts by weight of Epikote 828 (produced by Japan Epoxy Resins Co., Ltd.) as an epoxy prepolymer component and 70 parts by weight of toluene as a non-polymerizable organic solvent was added to 390 parts by weight of ion-exchange water containing 10 parts by weight of diethylenetriamine as an amine component, 2 parts by weight of sodium dodecylbenzene sulfonate as a water-soluble emulsifier and 2 parts by weight of cetyl alcohol as a dispersion aid, and the resulting mixture was emulsified forcibly for 60 minutes with an ultrasonic homogenizer to prepare a dispersion in which polymerizable droplets having an average particle diameter of 65 nm were dispersed.

A 20 L polymerizing vessel equipped with a stirrer, a jacket, a reflux condenser, and a thermometer was used and the inside of the vessel was deoxidize by reducing the internal pressure of the polymerizing vessel and replaced with nitrogen to be brought into a nitrogen atmosphere, and then, the obtained dispersion was charged into the vessel and a temperature of the polymerizing vessel was elevated to 80° C. to initiate polymerization. After polymerizing the vessel content for 4 hours and aging it for 1 hour, the polymerizing vessel was cooled to room temperature.

The obtained slurry was dialyzed with a cellulose membrane having a molecular weight cutoff of 10000 to eliminate the excessive surfactants and inorganic salts, and agglomerated particles and insoluble matter were further eliminated by filtration.

The obtained resin particles were dried under vacuum to obtain hollow resin particles.

The obtained hollow resin particle was observed with an electron microscope ("S-3500N" manufactured by Hitachi High-Technologies Corporation) and consequently it was found that the shape of the particle was almost spherical.

A coating agent for an antireflection film was prepared and an antireflection film was formed by following the same method as in Example 1 except for using the obtained hollow resin particle.

Example 4

50 parts by weight of Epikote 828 (produced by Japan Epoxy Resins Co., Ltd.) as an epoxy prepolymer component and 50 parts by weight of toluene were added to 390 parts by weight of ion-exchange water containing 10 parts by weight of diethylenetriamine as an amine component, 2 parts by weight of sodium dodecylbenzene sulfonate as a water-soluble emulsifier and 2 parts by weight of cetyl alcohol as a dispersion aid, and the resulting mixture was emulsified forcibly for 60 minutes with an ultrasonic homogenizer to prepare a dispersion in which polymerizable droplets having an average particle diameter of 72 nm were dispersed.

A 20 L polymerizing vessel equipped with a stirrer, a jacket, a reflux condenser, and a thermometer was used and the inside of the vessel was deoxidize by reducing the internal pressure of the polymerizing vessel and replaced with nitrogen to be brought into a nitrogen atmosphere, and then, the obtained dispersion was charged into the vessel and a temperature of the polymerizing vessel was elevated to 80° C. to initiate polymerization. After polymerizing the vessel content for 4 hours and aging it for 1 hour, the polymerizing vessel was cooled to room temperature.

The obtained slurry was dialyzed with a cellulose membrane having a molecular weight cutoff of 10000 to eliminate the excessive surfactants and inorganic salts, and agglomerated particles and insoluble matter were further eliminated by filtration.

The obtained resin particles were dried under vacuum to obtain hollow resin particles.

The obtained hollow resin particle was observed with an electron microscope ("S-3500N" manufactured by Hitachi High-Technologies Corporation) and consequently it was found that the shape of the particle was almost spherical.

A coating agent for an antireflection film was prepared and an antireflection film was formed by following the same method as in Example 1 except for using the obtained hollow resin particle.

Example 5

A whole amount of a mixed solution obtained by mixing and stirring 30 parts by weight of Epikote 828 (produced by Japan Epoxy Resins Co., Ltd.) as an epoxy prepolymer component and 65 parts by weight of toluene and 5 parts by weight of hexadecane as a non-polymerizable organic solvent was added to 390 parts by weight of ion-exchange water containing 10 parts by weight of diethylenetriamine as an amine component, 2 parts by weight of sodium dodecylbenzene sulfonate as a water-soluble emulsifier and 2 parts by weight of cetyl alcohol as a dispersion aid, and the resulting mixture was emulsified forcibly for 60 minutes with an ultrasonic homogenizer to prepare a dispersion in which polymerizable droplets having an average particle diameter of 42 nm were dispersed.

A 20 L polymerizing vessel equipped with a stirrer, a jacket, a reflux condenser, and a thermometer was used and the inside of the vessel was deoxidize by reducing the internal pressure of the polymerizing vessel and replaced with nitrogen to be brought into a nitrogen atmosphere, and then, the obtained dispersion was charged into the vessel and a temperature of the polymerizing vessel was elevated to 80° C. to initiate polymerization. After polymerizing the vessel content for 4 hours and aging it for 1 hour, the polymerizing vessel was cooled to room temperature.

The obtained slurry was dialyzed with a cellulose membrane having a molecular weight cutoff of 10000 to eliminate the excessive surfactants and inorganic salts, and agglomerated particles and insoluble matter were further eliminated by filtration.

The obtained resin particles were dried under vacuum to obtain hollow resin particles.

The obtained hollow resin particle was observed with an electron microscope ("S-3500N" manufactured by Hitachi High-Technologies Corporation) and consequently it was found that the shape of the particle was almost spherical.

A coating agent for an antireflection film was prepared and an antireflection film was formed by following the same method as in Example 1 except for using the obtained hollow resin particle.

Comparative Example 1

A coating agent for an antireflection film was prepared and an antireflection film was formed by following the same method as in Example 1 except for using porous silica particles having an average particle diameter of 60 nm and a refractive index of 1.36, which are coated with an organic silicon compound, as a particle having a low refractive index.

Example 6

A whole amount of a mixed solution obtained by mixing and stirring 20 parts by weight of Epikote 828 (produced by Japan Epoxy Resins Co., Ltd.) as an epoxy prepolymer component (a lipophilic reaction component A), 10 parts by weight of perfluorooctylethyl methacrylate as a radically polymerizable monomer component (a lipophilic reaction component C), 1 part by weight of azobis(isobutyronitrile) as a polymerization initiator, 65 parts by weight of toluene and 5 parts by weight of hexadecane as a non-polymerizable organic solvent was added to 390 parts by weight of ion-exchange water containing 10 parts by weight of diethylenetriamine (a hydrophilic reaction component B) as an amine component and 2 parts by weight of sodium dodecylbenzene sulfonate as a water-soluble emulsifier, and the resulting mixture was emulsified forcibly for 60 minutes with an ultrasonic homogenizer to prepare a dispersion in which polymerizable droplets having an average particle diameter of 78 nm were dispersed.

A 20 L polymerizing vessel equipped with a stirrer, a jacket, a reflux condenser, and a thermometer was used and the inside of the vessel was deoxidize by reducing the internal pressure of the polymerizing vessel and replaced with nitrogen to be brought into a nitrogen atmosphere, and then, the obtained dispersion was charged into the vessel and a temperature of the polymerizing vessel was elevated to 80° C. to initiate polymerization. After polymerizing the vessel content for 4 hours and aging it for 1 hour, the polymerizing vessel was cooled to room temperature.

The obtained slurry was dialyzed with a cellulose membrane having a molecular weight cutoff of 10000 to eliminate the excessive surfactants and inorganic salts, and agglomerated particles and insoluble matter were further eliminated by filtration.

The obtained resin particles were dried under vacuum to obtain hollow resin particles.

The obtained hollow resin particle was observed with an electron microscope ("S-3500N" manufactured by Hitachi High-Technologies Corporation) and consequently it was found that the shape of the particle was almost spherical. Further, the obtained hollow resin particle was observed with an electron microscope ("JEM-1200EXII" manufactured by JEOL Ltd.) and consequently it was found that the particle has a double-layer structure.

A coating agent for an antireflection film was prepared and an antireflection film was formed by following the same method as in Example 1 except for using the obtained hollow resin particle.

Example 7

A whole amount of a mixed solution obtained by mixing and stirring 20 parts by weight of DURANATE 21S (produced by Asahi Kasei Chemicals Corporation) as a polyisocyanate component (a lipophilic reaction component A), 10 parts by weight of perfluorooctylethyl methacrylate as a radically polymerizable monomer component (a lipophilic reaction component C), 1 part by weight of azobis(isobutyronitrile) as a polymerization initiator, 65 parts by weight of toluene and 5 parts by weight of hexadecane as a non-polymerizable compound was added to 390 parts by weight of ion-exchange water containing 10 parts by weight of ethyleneglycol as a polyol component (a hydrophilic reaction component B) and 2 parts by weight of sodium dodecylbenzene sulfonate as a water-soluble emulsifier, and the resulting mixture was emulsified forcibly for 60 minutes with an ultrasonic homogenizer to prepare a dispersion in which polymerizable droplets having an average particle diameter of 65 nm were dispersed.

A 20 L polymerizing vessel equipped with a stirrer, a jacket, a reflux condenser, and a thermometer was used and the inside of the vessel was deoxidize by reducing the internal pressure of the polymerizing vessel and replaced with nitrogen to be brought into a nitrogen atmosphere, and then, the obtained dispersion was charged into the vessel and a temperature of the polymerizing vessel was elevated to 80° C. to initiate polymerization. After polymerizing the vessel content for 4 hours and aging it for 1 hour, the polymerizing vessel was cooled to room temperature.

The obtained slurry was dialyzed with a cellulose membrane having a molecular weight cutoff of 10000 to eliminate the excessive surfactants and inorganic salts, and agglomerated particles and insoluble matter were further eliminated by filtration.

The obtained resin particles were dried under vacuum to obtain hollow resin particles.

The obtained hollow resin particle was observed with an electron microscope ("S-3500N" manufactured by Hitachi High-Technologies Corporation) and consequently it was found that the shape of the particle was almost spherical. Further, the obtained hollow resin particle was observed with an electron microscope ("JEM-1200EXII" manufactured by JEOL Ltd.) and consequently it was found that the particle has a double-layer structure.

A coating agent for an antireflection film was prepared and an antireflection film was formed by following the same method as in Example 1 except for using the obtained hollow resin particle.

Example 8

(1) Preparation of Organic-Inorganic Hybrid Particle

In A 20 L polymerizing vessel equipped with a stirrer, a jacket, a reflux condenser, and a thermometer, ion-exchange water adjusted to pH 9 as a polar medium was put, and to this, an emulsifier was added, and the resulting mixture was stirred.

The inside of the vessel was deoxidize by reducing the internal pressure of the polymerizing vessel and returned to atmospheric pressure with nitrogen to be brought into a nitrogen atmosphere.

After a temperature of the polymerizing vessel was elevated to 80° C., a mixed solution of a polymerizable silane coupling agent, a polymerizable monomer, ethyl acetate as a non-polymerizable organic solvent and azobis(isobutyronitrile) as a polymerization initiator was added to the polar medium and the resulting mixture was emulsified in the form of a nano-sized particle with a rotor-stator type homogenizer to prepare a dispersion in which the polymerizable droplets having an average particle diameter of 62 nm are dispersed and the polymerizable droplet was polymerized.

Then, the vessel content was readjusted to pH 5 with acetic acid and aged for 4 hours and the polymerizing vessel was cooled to room temperature to obtain slurry.

The obtained slurry was dialyzed with a cellulose membrane having a molecular weight cutoff of 10000 to eliminate the excessive surfactants and inorganic salts, and agglomerated particles and insoluble matter were further eliminated by filtration to prepare organic-inorganic hybrid particles.

A coating agent for an antireflection film was prepared and an antireflection film was formed by following the same method as in Example 1 except for using the obtained organic-inorganic hybrid particle.

Example 9

A whole amount of a mixed solution obtained by mixing and stirring 30 parts by weight of Epikote 828 (produced by Japan Epoxy Resins Co., Ltd.) as an epoxy prepolymer component and 65 parts by weight of toluene and 5 parts by weight of hexadecane as a non-polymerizable organic solvent was added to 390 parts by weight of ion-exchange water containing 7 parts by weight of diethylenetriamine as an amine component, 2 parts by weight of sodium dodecylbenzene sulfonate as a water-soluble emulsifier and 2 parts by weight of cetyl alcohol as a dispersion aid, and the resulting mixture was emulsified forcibly for 60 minutes with an ultrasonic homogenizer to prepare a dispersion in which polymerizable droplets having an average particle diameter of 63 nm were dispersed.

A 20 L polymerizing vessel equipped with a stirrer, a jacket, a reflux condenser, and a thermometer was used and the inside of the vessel was deoxidize by reducing the internal pressure of the polymerizing vessel and replaced with nitrogen to be brought into a nitrogen atmosphere, and then, the obtained dispersion was charged into the vessel and a temperature of the polymerizing vessel was elevated to 80° C. to initiate polymerization. The vessel content was polymerized for 4 hours and 3 parts by weight of N-2-(aminoethyl)-3-aminopropyltrimethoxysilane was added as an amine component for inorganic crosslinking and the mixture was further polymerized for 4 hours. After this, the vessel content was aged for 1 hour and the polymerizing vessel was cooled to room temperature.

The obtained slurry was dialyzed with a cellulose membrane having a molecular weight cutoff of 10000 to eliminate the excessive surfactants and inorganic salts, and agglomerated particles and insoluble matter were further eliminated by filtration to prepare organic-inorganic hybrid particles.

A coating agent for an antireflection film was prepared and an antireflection film was formed by following the same procedure as in Example 1 except for using the obtained organic-inorganic hybrid particle.

Comparative Example 2

Porous resin particles having an average particle diameter of 98 nm were prepared according to the method disclosed in Japanese Kokai Publication Hei-1-185311.

A coating agent for an antireflection film was prepared and an antireflection film was formed by following the same method as in Example 8 except for using a porous resin particle in place of the organic-inorganic hybrid particle prepared in Example 8.

(Evaluation)

The hollow resin particles (particles having a low refractive index) and the antireflection films obtained in Examples 1 to 7 and Comparative Example 1, and the organic-inorganic hybrid particles obtained in Examples 8, 9 and Comparative Example 2 were evaluated according to the following methods. The results are shown in Table 1.

(1) Measurement of Average Particle Diameter of Particle and CV Value of Particle Diameter Volume-average particle diameters of particles obtained in Examples and Comparative Examples and CV values of a particle diameter were measured using a particle size distribution analyzer based on a dynamic light scattering method ("NICOMP model 380 ZLS-S" manufactured by Particle Sizing Systems, Inc.)

(2) Measurement of Reflectivity of Antireflection Film

A surface of a base film was scraped with a sandpaper and a matte black coating agent was applied onto the surface, and a reflectivity of one side at an incident angle of 5° with light of 550 nm in wavelength was measured using a spectrophotometer ("UV-3101PC" manufactured by SHIMADZU CORPORATION).

(3) Measurement of Refractive Index and Hollow Rate of Particle

A refractive index of a particle was determined from a refractive index of an antireflection layer estimated from values of the reflectivity of an antireflection film, an refractive index of a binder alone not using particles, and a proportion of particles added to the antireflection layer.

The hollow rate of particles obtained in Examples and Comparative Examples was determined using the obtained refractive index of a particle, the measured value and the refractive index of a resin portion of a particle, which is calculated from the composition of resin. The hollow rate thus determined showed good agreement with the hollow rate of a particle calculated from a particle diameter and a film thickness of the particle observed by the electron microscope.

(4) Evaluation of Alkali Resistance of Antireflection Film

After a cellulose nonwoven fabric impregnated with a commercially available alkali detergent was moved to and from 100 times over each antireflection film with a load of 100 g/cm² being applied, the appearance of the antireflection film was observed visually and rated according to the following criteria.

◯: good

Δ: nearly good x: defective

TABLE 1

| | | Particle | | | | Antireflection film | |
|---|---|---|---|---|---|---|---|
| | | average particle diameter (nm) | CV value (%) | void fraction (%) | refractive index (%) | reflectivity (%) | alkali resistance |
| Hollow resin particle | Example 1 | 48 | 16 | 73 | 1.16 | 0.6 | ◯ |
| | Example 2 | 62 | 14 | 58 | 1.23 | 0.8 | ◯ |
| | Example 3 | 64 | 18 | 64 | 1.20 | 0.7 | ◯ |
| | Example 4 | 72 | 19 | 52 | 1.28 | 1.0 | ◯ |
| | Example 5 | 42 | 18 | 70 | 1.17 | 0.6 | ◯ |
| | Comparative Example 1 | 62 | — | 20 | 1.36 | 1.8 | x |
| Hollow resin particle | Example 6 | 78 | 16 | 70 | 1.15 | 0.6 | ◯ |
| | Example 7 | 65 | 18 | 59 | 1.2 | 0.7 | ◯ |
| Organic-inorganic hybrid particle | Example 8 | 62 | 20 | 71 | 1.18 | 0.6 | ◯ |
| | Example 9 | 63 | 17 | 68 | 1.19 | 0.7 | ◯ |
| | Comparative Example 2 | 98 | 22 | 0 | 1.50 | 3.7 | x |

◯: good

Δ: nearly good x: defective

INDUSTRIAL APPLICABILITY OF THE INVENTION

In accordance with the present invention, it is possible to provide a hollow resin particle and an organic-inorganic hybrid particle, which have excellent dispersibility in a binder component and prevent the diffuse reflection of light and can attain an antireflection layer having high alkali resistance when used as a particle constituting an antireflection layer having a low refractive index, and a method of producing the hollow resin particle.

The invention claimed is:

1. A method of producing a hollow resin particle,
having a single hollow structure and an average particle diameter being 10 to 100 nm,
which comprises:
a step of preparing a dispersion obtained by dispersing a polymerizable droplet containing a species selected from the group consisting of a polyisocyanate, an epoxy prepolymer and an acid halide as lipophilic reaction component A and an organic solvent in a polar medium containing at least one species selected from the group consisting of water, amine, polyol, and polycarboxylic acid as hydrophilic reaction component B;
a step of reacting the lipophilic reaction component A with the hydrophilic reaction component B; and
a step of removing the organic solvent from the resin particle.

2. A method of producing a hollow resin particle,
having a single hollow structure, an average particle diameter being 10 to 100 nm and a composite shell comprising at least two resin layers of an outermost layer and an inner layer,
which comprises:
a step of preparing a dispersion obtained by dispersing a polymerizable droplet containing a species selected from the group consisting of a polyisocyanate, an epoxy prepolymer and an acid halide as lipophilic reaction component A, a lipophilic reaction component C and an organic solvent in a polar medium containing at least one species selected from the group consisting of water, amine, polyol, and polycarboxylic acid as hydrophilic reaction component B;
a step of reacting the lipophilic reaction component A on a surface of the polymerizable droplet with the hydrophilic reaction component B and an organic solvent in the polar medium to form an outermost layer on the surface of the polymerizable droplet;
a step of reacting the lipophilic reaction component C within the polymerizable droplet to form an inner layer; and
a step of removing the organic solvent from the resin particle.

3. A hollow resin particle,
which has a single hollow structure, an average particle diameter being 10-100 nm, a refractive index being 1.40 or less, and a hollow rate being 30% or more,
wherein the hollow resin particle is produced by a method which comprises the steps of:
preparing a dispersion obtained by dispersing a polymerizable droplet containing a lipophilic reaction component A in a polar medium containing a hydrophilic reaction component B; and
reacting the lipophilic reaction component A with the hydrophilic reaction component B.

4. The hollow resin particle according to claim 3, which has an outermost layer comprising at least a resin obtained by a reaction of a lipophilic reaction component A and a hydrophilic reaction component B.

5. A hollow resin particle,
which has a single hollow structure and a composite shell comprising at least two resin layers of an outermost layer and an inner layer, a hollow rate being 30% or more, an average particle diameter being 10 to 100 nm and a refractive index being 1.40 or less,
wherein the hollow resin particle is produced by a method which comprises the steps of:
preparing a dispersion obtained by dispersing a polymerizable droplet containing a lipophilic reaction component A in a polar medium containing a hydrophilic reaction component B; and
reacting the lipophilic reaction component A with the hydrophilic reaction component B.

6. The hollow resin particle according to claim 5,
wherein the outermost layer is composed of a resin obtained by a reaction of a lipophilic reaction component A and a hydrophilic reaction component B, and the inner layer is composed of a resin obtained by a reaction of a lipophilic reaction component C not reacting with the lipophilic reaction component A and the hydrophilic reaction component B.

7. The hollow resin particle according to claim 3, which contains a fluorine-containing monomer.

8. The hollow resin particle according to claim 3, wherein the outermost layer contains at least one species of resin selected from the group consisting of polyurea, polyurethane, polyamide, polyester, nylon and epoxy polymer.

9. The hollow resin particle according to claim 3, which contains a resin crosslinked by an inorganic component.

10. A composition comprising the hollow resin particle according to claim 3.

11. A composition comprising the hollow resin particle according to claim 5.

12. A hollow resin particle,
which has a single hollow structure, an average particle diameter being 10-100 nm, a refractive index being 1.40 or less, and a hollow rate being 30% or more,
wherein the hollow resin particle is produced by a method which comprises the steps of:
preparing a dispersion obtained by dispersing a polymerizable droplet containing a lipophilic reaction component A and a lipophilic reaction component C in a polar medium containing a hydrophilic reaction component B;
reacting the lipophilic reaction component A on a surface of the polymerizable droplet with the hydrophilic reaction component B in the polar medium to form an outermost layer on the surface of the polymerizable droplet; and
reacting the lipophilic reaction component C within the polymerizable droplet to form an inner layer.

13. The hollow resin particle according to claim 12, which has an outermost layer comprising at least a resin obtained by a reaction of a lipophilic reaction component A and a hydrophilic reaction component B.

14. A hollow resin particle,
which has a single hollow structure and a composite shell comprising at least two resin layers of an outermost layer and an inner layer, a hollow rate being 30% or more, an average particle diameter being 10 to 100 nm and a refractive index being 1.40 or less, wherein the hollow resin particle is produced by a method which comprises the steps of:

preparing a dispersion obtained by dispersing a polymerizable droplet containing a lipophilic reaction component A and a lipophilic reaction component C in a polar medium containing a hydrophilic reaction component B;

reacting the lipophilic reaction component A on a surface of the polymerizable droplet with the hydrophilic reaction component B in the polar medium to form an outermost layer on the surface of the polymerizable droplet; and reacting the lipophilic reaction component C within the polymerizable droplet to form an inner layer.

15. The hollow resin particle according to claim 14, wherein the outermost layer is composed of a resin obtained by a reaction of a lipophilic reaction component A and a hydrophilic reaction component B, and the inner layer is composed of a resin obtained by a reaction of a lipophilic reaction component C not reacting with the lipophilic reaction component A and the hydrophilic reaction component B.

16. The hollow resin particle according to claim 12, which contains a fluorine-containing monomer.

17. The hollow resin particle according to claim 12, wherein the outermost layer contains at least one species of resin selected from the group consisting of polyurea, polyurethane, polyamide, polyester, nylon and epoxy polymer.

18. The hollow resin particle according to claim 12, which contains a resin crosslinked by an inorganic component.

19. A composition comprising the hollow resin particle according to claim 12.

20. A composition comprising the hollow resin particle according to claim 14.

21. The method according to claim 1, wherein the lipophilic reaction component A is a polyisocyanate and the hydrophilic reaction component B is at least one species selected from the group consisting of water, amine, polyol, and polycarboxylic acid.

22. The method according to claim 1, wherein the lipophilic reaction component A is an epoxy prepolymer and the hydrophilic reaction component B is an amine and/or a polycarboxylic acid.

23. The method according to claim 1, wherein the lipophilic reaction component A is an acid halide and the hydrophilic reaction component B is an amine or polyol.

24. The method according to claim 2, wherein the lipophilic reaction component A is a polyisocyanate and the hydrophilic reaction component B is at least one species selected from the group consisting of water, amine, polyol, and polycarboxylic acid.

25. The method according to claim 2, wherein the lipophilic reaction component A is an epoxy prepolymer and the hydrophilic reaction component B is an amine and/or a polycarboxylic acid.

26. The method according to claim 2, wherein the lipophilic reaction component A is an acid halide and the hydrophilic reaction component B is an amine or polyol.

* * * * *